(12) United States Patent  
Greenwood et al.

(10) Patent No.: US 8,919,464 B2  
(45) Date of Patent: Dec. 30, 2014

(54) ARRANGEMENTS FOR DRIVING AND STEERING OF MOTOR VEHICLES

(75) Inventors: Christopher John Greenwood, Preston (GB); Ian David Cornwell, Preston (GB)

(73) Assignee: MTD Products Inc., Valley City, OH (US)

( * ) Notice: Subject to any disclaimer, the term of this patent is extended or adjusted under 35 U.S.C. 154(b) by 1944 days.

(21) Appl. No.: 12/097,872

(22) PCT Filed: Aug. 18, 2006

(86) PCT No.: PCT/EP2006/065464  
§ 371 (c)(1),  
(2), (4) Date: Sep. 29, 2010

(87) PCT Pub. No.: WO2007/023138  
PCT Pub. Date: Mar. 1, 2007

(65) Prior Publication Data  
US 2011/0053731 A1 Mar. 3, 2011

(30) Foreign Application Priority Data  
Aug. 22, 2005 (GB) .................................... 0517201.0

(51) Int. Cl.  
*B62D 11/00* (2006.01)

(52) U.S. Cl.  
CPC .................................... *B62D 11/006* (2013.01)  
USPC .............................. 180/6.24; 180/6.32; 476/1

(58) Field of Classification Search  
USPC ............. 180/6.2, 6.24, 6.26, 6.32, 6.34, 6.36, 180/6.38; 476/1, 40  
See application file for complete search history.

(56) References Cited

U.S. PATENT DOCUMENTS

| | | | |
|---|---|---|---|
| 1,045,752 A * | 11/1912 | Scharf | 180/6.32 |
| 1,794,241 A | 2/1931 | Patterson | 74/334 |

(Continued)

FOREIGN PATENT DOCUMENTS

| | | |
|---|---|---|
| EP | 0 754 613 | 1/1997 |
| EP | 1 000 793 | 5/2000 |

(Continued)

OTHER PUBLICATIONS

"SST15, SST16, and SST18 Spin-Steer Technology™ lawn tractors," Litho in U.S.A., Apr. 2003.

(Continued)

*Primary Examiner* — William C Joyce  
(74) *Attorney, Agent, or Firm* — Fulbright & Jaworski LLP

(57) ABSTRACT

A transmission arrangement for an engine driven vehicle having two continuously variable transmissions serving to drive left and right hand vehicle wheels at separately variable drive ratios. Each transmission incorporates a variator of the type in which a net torque applied to the variator through its input and output is referred to a ratio control part, which may be formed as a control lever, whose position governs the transmission's drive ratio. The control parts of the variators are each operatively coupled to a driver's speed control, such that the speed control determines a mean position of the two control parts. However they are both also able to move relative to the mean position, under the influence of the torque they react. Additionally the control parts are coupled to each other such that any displacement of one control part from the mean position is accompanied by an opposite displacement of the other control part. In this way the transmissions are enabled to the relative speeds of the driven vehicle wheels automatically to reduce or even eliminate wheel slip, whilst still providing the driver with control over overall vehicle speed.

24 Claims, 19 Drawing Sheets

(56) References Cited

U.S. PATENT DOCUMENTS

| | | | | |
|---|---|---|---|---|
| 3,362,493 A | 1/1968 | Davis et al. | | 180/6.32 |
| 3,398,819 A | 8/1968 | Ruhl et al. | | 192/221 |
| 3,429,392 A | 2/1969 | Ryskamp | | 180/6.3 |
| 3,572,033 A | 3/1971 | Tolley | | 60/427 |
| 3,581,682 A | 6/1971 | Kontranowski | | 180/55 |
| 3,712,403 A | 1/1973 | Pakosh | | 180/6.48 |
| 3,865,208 A | 2/1975 | Crawshay et al. | | 180/6.48 |
| 3,900,075 A | 8/1975 | Chichester et al. | | 180/6.3 |
| 3,913,695 A | 10/1975 | Holdenried et al. | | 180/6.48 |
| 4,100,738 A | 7/1978 | Seaberg et al. | | 60/327 |
| 4,339,966 A | 7/1982 | Kraus | | 74/650 |
| 4,399,882 A | 8/1983 | O'Neill et al. | | 180/6.48 |
| 4,572,310 A | 2/1986 | Peter | | 180/6.24 |
| 4,852,679 A | 8/1989 | Fry | | 180/234 |
| 4,875,536 A | 10/1989 | Saur et al. | | 180/6.32 |
| 4,882,947 A | 11/1989 | Barnard | | 475/23 |
| 4,969,522 A | 11/1990 | Whitehurst et al. | | 180/273 |
| 4,969,533 A | 11/1990 | Holm et al. | | 180/273 |
| 5,042,238 A | 8/1991 | White, III et al. | | 56/11.8 |
| 5,078,222 A | 1/1992 | Hauser et al. | | 180/6.48 |
| RE34,057 E | 9/1992 | Middlesworth | | 180/6.2 |
| 5,238,267 A | 8/1993 | Hutchison et al. | | 280/767 |
| 5,263,901 A | 11/1993 | Kawakami et al. | | 180/6.48 |
| 5,288,091 A | 2/1994 | Deschamps | | 180/409 |
| 5,529,135 A | 6/1996 | Wenzel et al. | | 180/6.24 |
| 5,766,105 A | 6/1998 | Fellows et al. | | 474/18 |
| 5,809,755 A | 9/1998 | Velke et al. | | 56/10.8 |
| 5,848,520 A | 12/1998 | Arfstrom et al. | | 56/11.4 |
| 5,850,886 A | 12/1998 | Kouno et al. | | 180/6.24 |
| 5,941,334 A | 8/1999 | Inagaki et al. | | 180/242 |
| 6,092,617 A | 7/2000 | White, III et al. | | 180/338 |
| 6,129,164 A | 10/2000 | Teal et al. | | 180/6.2 |
| 6,152,248 A | 11/2000 | Hidaka et al. | | 180/6.38 |
| 6,196,342 B1 | 3/2001 | Teal et al. | | 180/6.2 |
| 6,230,829 B1 | 5/2001 | Martin et al. | | 180/6.3 |
| 6,256,357 B1 | 7/2001 | Oshima | | 375/338 |
| 6,257,357 B1 | 7/2001 | Teal et al. | | 180/6.2 |
| 6,301,864 B1 | 10/2001 | Damie et al. | | 56/11.3 |
| 6,408,960 B1 | 6/2002 | Hidaka et al. | | 180/6.38 |
| 6,434,919 B2 | 8/2002 | Schick | | 56/15.9 |
| 6,447,419 B1 | 9/2002 | Irikura et al. | | 475/24 |
| 6,456,925 B1 | 9/2002 | Romig | | 701/93 |
| 6,523,635 B1 | 2/2003 | Johnston et al. | | 180/307 |
| 6,540,633 B1 | 4/2003 | Hasegawa et al. | | 475/24 |
| 6,554,085 B2 | 4/2003 | Hasegawa et al. | | 180/6.26 |
| 6,601,663 B2 | 8/2003 | Hauser | | 180/6.3 |
| 6,659,216 B2 | 12/2003 | Irikura et al. | | 180/307 |
| 6,672,411 B1 | 1/2004 | Mouser | | 180/6.32 |
| 6,688,090 B2 | 2/2004 | Velke et al. | | 56/14.7 |
| 6,725,954 B1 | 4/2004 | Keane et al. | | 180/6.48 |
| 6,729,115 B2 | 5/2004 | Bartel | | 56/11.3 |
| 6,771,034 B2 | 8/2004 | Reile et al. | | 318/139 |
| 6,808,032 B2 | 10/2004 | Wuertz et al. | | 180/6.48 |
| 6,830,115 B2 | 12/2004 | Okada et al. | | 180/6.24 |
| 6,874,305 B2 | 4/2005 | Ishimori | | 56/10.8 |
| 6,904,985 B2 | 6/2005 | Ferree et al. | | 180/6.32 |
| 6,905,985 B1 | 6/2005 | Schindzielorz et al. | | 442/65 |
| 6,912,831 B2 | 7/2005 | Velke et al. | | 56/10.9 |
| 6,921,109 B2 | 7/2005 | Hutchison et al. | | 280/771 |
| 6,945,353 B2 | 9/2005 | Bishop | | 180/446 |
| 6,951,259 B2 | 10/2005 | Irikura | | 180/6.3 |
| 6,962,219 B2 | 11/2005 | Hauser | | 180/6.34 |
| 7,004,268 B2 | 2/2006 | Irikura | | 180/6.3 |
| 7,017,327 B2 | 3/2006 | Hunt et al. | | 56/14.7 |
| 7,059,433 B2 | 6/2006 | Hasegawa et al. | | 180/6.2 |
| 7,108,096 B1 | 9/2006 | Oxley et al. | | 180/170 |
| 7,237,629 B1 | 7/2007 | Bland et al. | | 180/6.24 |
| 7,347,434 B2 | 3/2008 | Lewis et al. | | 280/99 |
| 7,395,912 B2 | 7/2008 | Ooishi et al. | | 192/99 S |
| 7,431,123 B2 | 10/2008 | Irikura et al. | | 180/307 |
| 7,533,892 B2 | 5/2009 | Schena et al. | | 280/47.11 |
| 7,914,022 B2 | 3/2011 | Ruebusch et al. | | 280/93.502 |
| 7,992,659 B2 | 8/2011 | Schaedler et al. | | 180/6.24 |
| 2002/0092685 A1 | 7/2002 | Hauser | | 180/6.3 |
| 2002/0108800 A1 | 8/2002 | Irikura et al. | | 180/307 |
| 2002/0113564 A1 | 8/2002 | Reile et al. | | 318/139 |
| 2003/0019682 A1 | 1/2003 | Schaedler et al. | | 180/308 |
| 2003/0102171 A1 | 6/2003 | Hauser | | 180/6.2 |
| 2003/0106725 A1 | 6/2003 | Irikura | | 180/6.26 |
| 2003/0213625 A1 | 11/2003 | Okada et al. | | 180/6.2 |
| 2004/0040779 A1 | 3/2004 | Bishop | | 180/443 |
| 2004/0144590 A1 | 7/2004 | Fluent et al. | | 180/326 |
| 2004/0245029 A1 | 12/2004 | Irikura | | 180/6.24 |
| 2005/0003919 A1 | 1/2005 | Hasegawa et al. | | 475/83 |
| 2005/0023049 A1 | 2/2005 | Ferree et al. | | 180/6.3 |
| 2005/0145421 A1 | 7/2005 | Ishimori | | 180/6.32 |
| 2005/0209564 A1 | 9/2005 | Bonner et al. | | 604/173 |
| 2006/0278446 A1 | 12/2006 | Oxley et al. | | 180/6.24 |
| 2007/0144796 A1 | 6/2007 | Schaedler et al. | | 180/6.24 |
| 2007/0175676 A1 | 8/2007 | Irikura | | 180/6.48 |
| 2008/0136134 A1 | 6/2008 | McCoid et al. | | 280/93.502 |
| 2008/0184687 A1 | 8/2008 | Scherbring et al. | | 56/10.1 |
| 2008/0217092 A1 | 9/2008 | Ruebusch et al. | | 180/338 |
| 2009/0178862 A1 | 7/2009 | Greenwood et al. | | 180/6.2 |
| 2009/0188728 A1 | 7/2009 | Osborne | | 180/6.24 |
| 2009/0194965 A1 | 8/2009 | Boston | | 280/124.136 |

FOREIGN PATENT DOCUMENTS

| | | |
|---|---|---|
| EP | 1 186 459 | 3/2002 |
| GB | 2015666 | 9/1979 |
| GB | 2119328 | 4/1982 |
| GB | 2303829 | 3/1997 |
| WO | WO 03/100295 | 12/2003 |
| WO | WO 2008/060169 | 5/2008 |

OTHER PUBLICATIONS

Hidaka, "Development of forced differential steering control system," *Automation Technology for Off-Road Equipment,* Proceeding of the Oct. 7-8, 2001 Conference, Kyoto, Japan, Oct. 7, 2004.

Office Communication issued in U.S. Appl. No. 11/490,881, dated Mar. 13, 2009.

Response to Office Communication issued in U.S. Appl. No. 11/490,881, submitted Apr. 13, 2009.

Office Communication issued in U.S. Appl. No. 11/490,881, dated Jul. 2, 2009.

Office Communication issued in U.S. Appl. No. 11/269,899, dated Feb. 6, 2007.

Response to Feb. 6, 2007 Office Communication, U.S. Appl. No. 11/269,899, submitted Aug. 6, 2007.

Office Communication issued in U.S. Appl. No. 11/269,899, dated Nov. 19, 2007.

Response to Nov. 19, 2007 Office Communication, U.S. Appl. No. 11/269,899, submitted Dec. 19, 2007.

Office Communication issued in U.S. Appl. No. 11/269,899, dated Apr. 1, 2009.

European Office Communication issued in Application No. 06 792 907.5-1264, dated Feb. 2, 2009.

European Office Communication issued in Application No. 06 792 905.9-1264, dated Mar. 13, 2009.

Notice of Allowance issued in U.S. Appl. No. 11/269,899, dated Apr. 15, 2011.

Notice of Allowance issued in U.S. Appl. No. 11/490,881, dated Oct. 27, 2010.

Notice of Allowance issued in U.S. Appl. No. 11/490,881, dated Apr. 5, 2011.

Notice of Allowance issued in U.S. Appl. No. 11/874,130, dated Nov. 29, 2010.

Office Communication issued in European Patent Application No. 06788098.9, dated Feb. 24, 2011.

Office Communication issued in European Patent Application No. 06792907.5, dated Feb. 19, 2010.

Office Communication issued in European Patent Application No. 06792905.9, dated May 13, 2009.

Office Communication issued in European Patent Application No. 06792905.9, dated Jul. 28, 2010.

Office Communication issued in European Patent Application No. 06792907.5, dated Apr. 19, 2010.

(56) References Cited

OTHER PUBLICATIONS

Office Communication issued in Mexican Patent Application No. MX/a/2008/001022, dated Apr. 27, 2011. (English summary provided).
Office Communication issued in U.S. Appl. No. 13/081,482, dated Sep. 26, 2011.
Office Communication issued in U.S. Appl. No. 12/483,825, dated Jun. 22, 2011.
Office Communication issued in U.S. Appl. No. 11/874,130, dated Jan. 22, 2010.
Office Communication issued in U.S. Appl. No. 11/874,130, dated Aug. 18, 2010.
Office Communication issued in U.S. Appl. No. 13/051,711, dated Aug. 18, 2011.
Office Communication issued in U.S. Appl. No. 12/055,668, dated May 25, 2011.
Office Communication issued in U.S. Appl. No. 12/097,875, dated Dec. 13, 2010.
Office Communication issued in U.S. Appl. No. 11/269,899, dated Jun. 15, 2010.
PCT International Preliminary Report on Patentability issued in International Patent Application No. PCT/US2007/081683, dated Apr. 30, 2009.
PCT International Preliminary Report on Patentability issued in International Patent Application No. PCT/US2009/038404, dated Jun. 30, 2010.
PCT International Preliminary Report on Patentability, issued in International Application No. PCT/EP2006/065464, dated Feb. 26, 2008.
PCT International Search Report and Written Opinion issued in International Patent Application No. PCT/US2007/081683, dated Apr. 30, 2008.
PCT International Search Report and Written Opinion issued in International Patent Application No. PCT/EP2006/065467, dated Dec. 15, 2006.
PCT International Search Report and Written Opinion issued in International application No. PCT/EP2006/065464, dated Oct. 17, 2006.
Response to Office Communication submitted in European Patent Application No. 06792907.5, dated Aug. 27, 2009.
Response to Office Communication submitted in European Patent Application No. 06792907.5, dated Feb. 15, 2011.
Response to Office Communication submitted in International Patent Application No. PCT/US2009/038404, dated Apr. 6, 2010.
Response to Office Communication submitted in U.S. Appl. No. 13/081,482, dated Oct. 26, 2011.
Response to Office Communication submitted in U.S. Appl. No. 11/874,130, dated May 24, 2010.
Response to Office Communication submitted in U.S. Appl. No. 11/874,130, dated Nov. 10, 2010.
Response to Office Communication submitted in U.S. Appl. No. 12/055,668, dated Oct. 25, 2011.
Response to Office Communication submitted in U.S. Appl. No. 12/097,875, dated Mar. 17, 2011.
Response to Office Communication submitted in U.S. Appl. No. 12/097,875, dated Oct. 11, 2011.
Response to Office Communication submitted in European Patent Application No. 06788098.9, dated Jul. 30, 2010.
Response to Office Communication submitted in European Patent Application No. 06792905.9, dated Jan. 31, 2011.
Response to Office Communication submitted in U.S. Appl. No. 11/269,899, dated Dec. 19, 2008.
Response to Office Communication submitted in U.S. Appl. No. 11/269,899, dated Nov. 8, 2010.
Response to Office Communication submitted in U.S. Appl. No. 11/490,881, dated Jul. 22, 2010.
Search Report issued in Great Britain Patent Application No. GB0517200.2, dated Dec. 22, 2005.
Search Report issued in Great Britain Patent Application No. GB0517201.0, dated Dec. 23, 2005.
Notice of Allowance issued in U.S. Appl. No. 12/055,668, dated Nov. 14, 2011.
Notice of Allowance issued in U.S. Appl. No. 12/097,875, dated Dec. 13, 2011.
Office Communication issued in U.S. Appl. No. 13/081,482, dated Dec. 20, 2011.
Office Action, in U.S. Appl. No. 11/490,881, mailed Feb. 19, 2010.
PCT International Search Report and Written Opinion, in Int. App. No. PCT/US06/28357, mailed Aug. 8, 2007.
Response to Office Action, in European App. No. 06792907.5, dated Aug. 27, 2009.
Response to Office Action, in European App. No. 06792905.9, dated Oct. 30, 2009.
International Search Report and Written Opinion, issued in Application No. PCT/US2009/038404, mailed Jan. 8, 2010.
New Zealand Examination Report, issued in Application No. 566485, mailed Sep. 24, 2009.
European Office Action, issued in European Application No. 06788098.9, mailed Oct. 12, 2009.
Supplementary European Search Report, issued in Int. App. No. EP 06 78 8098, mailed Jul. 14, 2009.
New Zealand Examination Report, issued in Int. App. No. 566486, mailed Sep. 29, 2009.
Response to Jul. 2, 2009 Office Action, submitted in U.S. Appl. No. 11/490,881, dated Sep. 24, 2009.
Response to Apr. 1, 2009 Office Action, submitted in U.S. Appl. No. 11/269,899, dated Oct. 1, 2009.

* cited by examiner

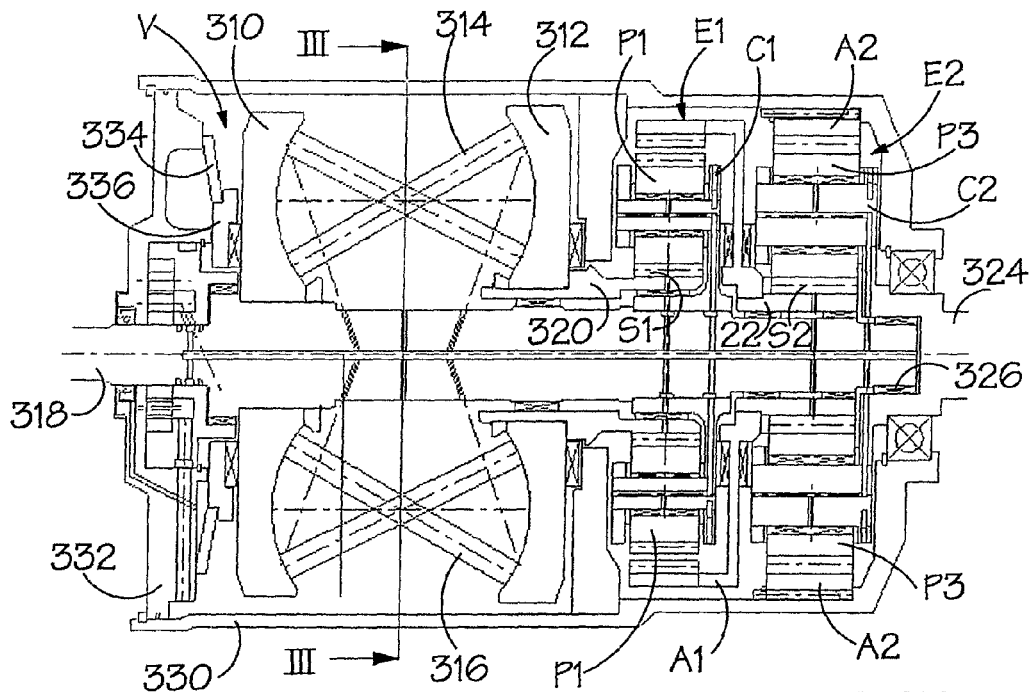
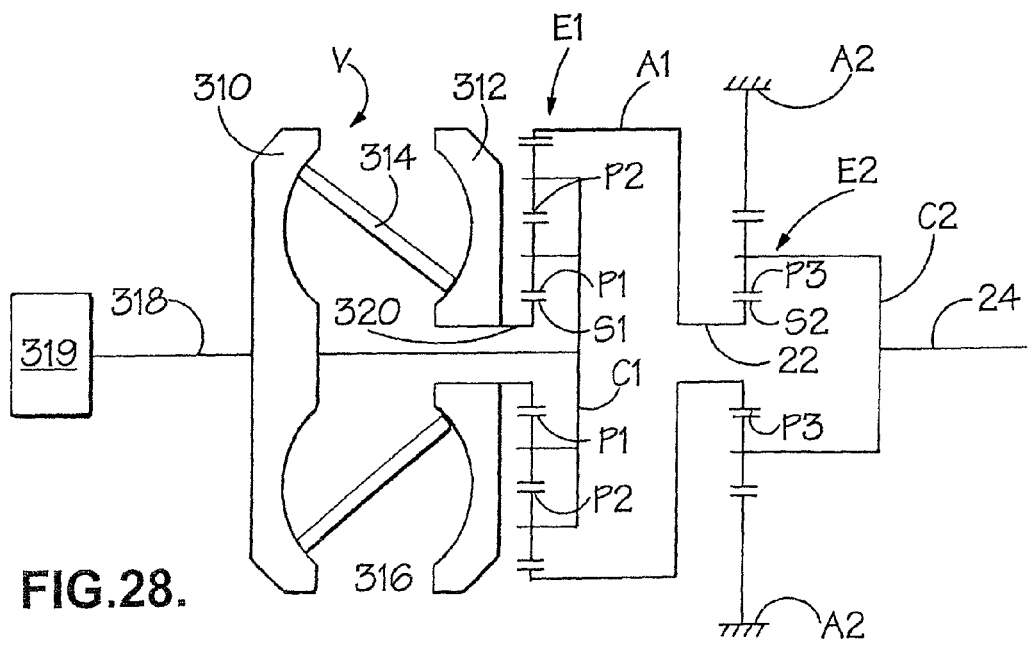

ARRANGEMENTS FOR DRIVING AND STEERING OF MOTOR VEHICLES

CROSS REFERENCES TO RELATED APPLICATIONS

This application is a national phase application under 35 U.S.C. §371 of International Application No. PCT/EP2006/065464 filed Aug. 18, 2006, which claims priority to Great Britain Application No. 0517201.0 filed Aug. 22, 2005, both of which are incorporated by reference without disclaimer.

The present invention is concerned with arrangements for driving and steering motor vehicles, of the type in which vehicle wheels on the left and right hand sides of the vehicle are driven through respective transmissions whereby the relative speeds of the wheels can be varied in accordance with a desired vehicle turning radius.

Vehicles can be steered by controlling the relative speeds of driven wheels on opposite sides of the vehicle. The principle is simple. If the wheel on one side of the vehicle is driven faster than the wheel on the other side, then the vehicle turns, with the slower moving wheel being on the inside of the turn. The wheel on the inside of the turn may be stationary, or may even be driven in the opposite direction from the other wheel. In the extreme case where the two wheels are driven at equal and opposite speeds, the vehicle can be caused to spin about its centre. This principle is used in steering many different types of motor vehicle including various agricultural and horticultural machines including ride-on lawnmowers.

Where the vehicle has steerable wheels, such as the front wheels of a conventional ride-on lawnmower, the necessary steering effect may in principle be achieved solely by control of driven wheel speed, with the steerable wheels being arranged as castors to follow the radius of turn determined by the driven wheels. Alternatively the steerable wheels may be positively controlled (e.g. through a conventional rack and pinion steering system) to produce the desired radius of turn, while the relative speeds of the driven wheels are set to produce the same radius. Compared with the alternative of guiding the vehicle by means of the steerable wheels only, this arrangement has the advantage of allowing the vehicle to turn very tightly and even to spin on the spot. It also provides a very positive form of steering, which is desirable on soft or uneven ground.

One way to achieve the necessary control over the speed and direction of rotation of the driven vehicle wheels involves the use of one engine but two essentially independent continuously variable transmissions, through which the engine drives the left and right hand vehicle wheels respectively. In the case of small horticultural vehicles such as ride-on lawnmowers, continuously variable transmissions of hydrostatic type have been used in this role.

Problems arise where there is a mismatch between (i) the turning circle corresponding to the inclination of the steerable wheels and (ii) the turning circle corresponding to the speed differential of the driven vehicle wheels. Such a mismatch may arise due to tolerances and errors in manufacture, maladjustment, or simply due to the vehicle moving over uneven terrain. Of course in a motor car having a differential gear to distribute torque to the left and right hand wheels, variation in the wheels' relative speeds is permitted. Use of a differential in the present context would however defeat the object. The consequence of the mismatch is wheel slip. The problem is particularly important in connection with horticultural vehicles such as ride-on lawnmowers, where damage to the supporting surface (e.g. turf) can be caused by wheel slip.

SUMMARY

The present invention derives from the recognition that some continuously variable transmissions are capable of adjusting their own ratio suitably to reduce or even prevent wheel slip, if given the freedom to do so. The relevant principles will now be explained.

A continuously variable transmission typically has a ratio-varying device ("variator") coupled to the transmission input and output through associated gearing. The variator has a rotary input and output and drives one from the other at variable ratio. It is subject in use to a "reaction torque", defined as the sum of torques applied to its input and output. The reaction torque must be referred to some fixed point since the variator would otherwise rotate under its influence. In some transmissions, an example of which will be provided, the reaction torque is referred to a control arrangement through at least one control part, which may be a piston of a hydraulic system, a lever of a mechanical system etc. The control part's position corresponds to the variator's drive ratio. Moving it changes that ratio. The reaction torque is referred through the control part—in the form of a pressure, force etc—to the control arrangement.

Consider what happens if the wheel driven by such a transmission is tending to slip, e.g. because it is rotating too slowly to "keep up" with the other wheels. The result will be a modification in the torque applied to the variator at its output, and hence to the reaction torque. The force (or pressure etc.) referred through the control part to the control arrangement will be modified in a manner which tends to cause the control part to move—and the ratio to change—in a sense which reduces the wheel slip. Hence by giving the ratio control part at least limited freedom to move independently of the driver's steering control, the variator can automatically adjust its own drive ratio suitably to reduce any wheel slip.

However this must be achieved while at the same time giving the driver control over the vehicle's overall speed.

In accordance with a first aspect of the present invention, there is a transmission arrangement for a motor vehicle, the arrangement comprising a speed control actuable by a driver of the vehicle;

a first continuously variable ratio device ("variator") coupled between the engine and a right hand vehicle wheel and serving to determine a first drive ratio, at which the right hand vehicle wheel is driven by the engine; and a second variator coupled between the engine and a left hand vehicle wheel and serving to determine a second drive ratio, at which the left hand vehicle wheel is driven from the engine, wherein both variators are of the type in which a net torque applied to the variator is reacted through at least one movable ratio control part whose position governs the drive ratio, the control parts of the first and second variators are each operatively coupled to the speed control, such that the speed control determines a mean position of the two control parts, each of the control parts is able to move relative to the mean position, under the influence of the torque which it reacts, and the control parts are coupled to each other such that any displacement of one control part from the mean position is accompanied by an opposite displacement of the other control part, so that through the speed control the driver has control over overall vehicle speed, but a difference between the first and second drive ratios is able to vary to accommodate differences in speed of the left and right driven vehicle wheels.

In principle, this aspect of the invention is applicable even where the speeds of the driven wheels are not influenced by the driver's steering input. In this case, the arrangement functions similarly to a conventional transmission using a single gearbox or CVT to drive left and right vehicle wheels through a differential gear Torque is divided between the driven wheels, but they are able to freely change their relative speeds to accommodate turning of the vehicle.

However, it is especially preferred that the arrangement further comprises a steering control which is actuable by the driver and which acts upon the first and second ratio control parts to influence their displacements from the mean position.

This influence may in principle take any of three different forms:—
1. the ratio control parts may be free to move, under the influence of the torque they react, and subject to the coupling between them which ensures that they are oppositely displaced from the mean position, through a limited range on either side of positions determined through the speed and steering controls. This can be achieved by providing some form of backlash or play in the mechanism coupling the steering control to the ratio control parts.
2. the ratio control parts may be mechanically biased toward positions dictated by the steering control, but able to move away from these positions, against the biasing force. This can be achieved by provision of compliance in the mechanism coupling the steering control to the control parts.
3. a combination of (1) and (2) above may be used—i.e. the ratio control parts are biased toward a position determined by the steering control and have only a limited range of movement about that position.

Hence the steering control tends to set the relative wheel speeds as dictated by the steering control, but allows them some freedom to vary in accordance with terrain, mismatch with steered wheel position etc. This freedom of the ratio control parts may be achieved through compliance in a coupling between the steering control and the ratio control parts, or through backlash or play in the coupling.

In accordance with a second aspect of the present invention, there is an arrangement for driving and steering a motor vehicle, the arrangement comprising: a user operable steering control; at least one steered vehicle wheel movable by means of the steering control to steer the vehicle; a right hand transmission for transmitting rotary drive between a motor vehicle engine and a right hand driven vehicle wheel at a continuously variable drive ratio; and a left hand transmission for transmitting rotary drive between the motor vehicle engine and a left hand driven vehicle wheel at a continuously variable drive ratio, wherein both transmissions incorporate a respective ratio-varying device ("variator") of the type in which variator reaction torque is referred to a ratio control part whose position governs the variator's drive ratio, the ratio control part of each variator is operatively coupled to the steering control, whereby a difference in speeds of the right and left hand driven vehicle wheels is urged to vary in sympathy with the position of the steered vehicle wheel(s), and the operative coupling of each ratio control part to the steering control incorporates a compliance or backlash, by virtue of which the ratio control part is permitted to move, under the influence of the reaction torque referred to it, as necessary to reduce any mismatch between the aforementioned difference in wheel speeds and the radius of vehicle turn dictated by the steered vehicle wheel(s).

In accordance with a third aspect of the present invention, there is an arrangement for driving a motor vehicle, the arrangement comprising: a user-operable speed control; a first continuously variable ratio device ("variator") coupled between the engine and a right hand vehicle wheel and serving to control a first ratio, at which the right hand vehicle wheel is driven by the engine; a second variator coupled between the engine and a left hand vehicle wheel and serving to control a second ratio, at which the left hand vehicle wheel is driven from the engine, wherein both variators are of the type in which a net torque applied to the variator is reacted through at least one movable ratio control part whose position governs the drive ratio, and a control arrangement is coupled to the control parts and serves to set target values of the first and second ratios in dependence upon driver input, the variator ratios being able to deviate from their target values under the influence of the torques reacted by the control parts, and the control parts being coupled together such that an increase in one of the ratios is accompanied by a decrease in the other, such that a difference in speeds of the left and right hand wheels is able to vary whilst control over vehicle speed is maintained.

In accordance with a fourth aspect of the present invention there is an arrangement for driving and steering a motor vehicle, the arrangement comprising
 a driver actuable steering control
 at least one steered vehicle wheel movable by means of the steering control to steer the vehicle
 a right hand transmission for transmitting rotary drive between a motor vehicle engine and a right hand driven vehicle wheel at a continuously variable drive ratio, and
 a left hand transmission for transmitting rotary drive between the motor vehicle engine and a left hand driven vehicle wheel at a continuously variable drive ratio, wherein
 both transmissions incorporate a respective ratio-varying device ("variator") of the type in which variator reaction torque is referred to a control part whose position corresponds to the variator's drive ratio
 the control part of each variator is operatively coupled to the steering control, whereby a difference in speeds of the right and left hand driven vehicle wheels is caused to vary in sympathy with the position of the steered vehicle wheel(s) and
 the operative coupling of the control part to the steering control incorporates a compliance, by virtue of which the control part is permitted to move, under the influence of the reaction torque referred to it, as necessary to reduce any mismatch between the aforementioned difference in wheel speeds and the radius of turn dictated by the steered vehicle wheel(s).

It must be stressed that the coupling of the steering control to the variator's control parts need not be direct, and need not be solely mechanical. It could for example incorporate electric actuators or hydraulics. The "engine" may be an internal combustion engine but it may alternatively be a different type of rotary driver such as an electric motor or external combustion engine. The terms "right" and "left hand transmission" refer to the fact that the transmissions in question are coupled to right and left hand vehicle wheels and do not necessarily denote the positions of the transmissions themselves, nor is the physical construction of the two transmissions necessarily wholly separate.

BRIEF DESCRIPTION OF THE DRAWINGS

Specific embodiments of the present invention will now be described, by way of example only, with reference to the accompanying drawings, in which:—

FIG. 27 is a section in a longitudinal plane through a transmission suitable for use in implementing the present invention;

FIG. 28 is a schematic representation of the same transmission;

DETAILED DESCRIPTION

Figure 1:
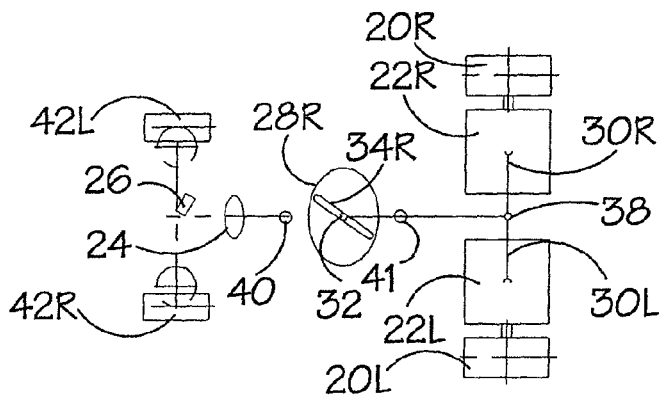
FIGS. 1-7 are highly schematic representations of a first steering and drive arrangement in accordance with the present invention.

The steering and drive arrangement illustrated in FIGS. 1-9 does not in itself embody the invention claimed herein, since it does not provide freedom for the transmissions to adjust their own ratios. However it serves to demonstrate how other aspects of the arrangement work. A modification, to provide the necessary freedom for the variators, will be described below.

Left and right hand driven vehicle wheels are seen at 20L and 20R. Each is driven through a respective transmission 22L and 22R of continuously variable type, capable of providing a continuous range of ratios from forward to reverse. The driver dictates the vehicle's speed and direction through two controls, which are represented in schematic form in the drawings: a steering control 24, which may take the form of a conventional steering wheel, and a speed control 26, which may be formed as a foot pedal. The pedal is somewhat different from the accelerator control of a motor car, in that it can rocked forwards, using the front of the foot, to select forward drive, or backwards, using the heel, to select reverse. The pedal is sprung toward a central position in which it causes both transmissions to adopt geared neutral. Other types of user-operable control may of course be used in these roles. Also the two controls could be formed by a single assembly. For example the driver could be provided with a steering bar or wheel which is rotatable to steer and movable fore-and-aft to change speed.

The driver's inputs through the controls 24, 26 determine (subject to some compliant variation, as explained below) the ratios adopted by the transmissions 22L, 22R, acting through a mechanism comprising left and right-hand guide plates 28L, 28R and left and right hand actuating levers 30L, 30R. The driver is typically provided with a separate control—e.g. a hand operated lever—for setting engine speed. In vehicles using speed governed diesel engines, the driver typically sets the engine speed with the lever and subsequently controls the speeds of the driven wheels by means of the transmissions. In the present embodiment, the guide plates 28L, 28R are actually placed one above the other, and are mounted for rotation about a common axis 32. Hence in FIG. 1 only right-hand (upper) guide plate 28R is seen. However in FIGS. 2 to 7, for the sake of clarity, the two guide plates are shown side-by-side, which allows both to be seen. The guide plates each define a respective path for guiding a follower. In the illustrated embodiment, the path is simply a straight slot 34L, 34R in the guide plate and the follower 36L, 36R is formed as a pin riding in the slot. Each follower is carried on a respective one of the actuating levers 30L, 30R, and each lever is mounted for rotation about a fixed fulcrum 38. The actuating levers are, in the present embodiment, "L" shaped, the follower being carried upon one limb while the other limb engages with the corresponding transmission 22L or 22R to set its ratio. Lateral movement of the follower 36L or 36R causes lever 30L or 30R to rotate and produces a change in ratio of the relevant transmission 22L or 22R. Consequently the ratios provided by the transmissions 22L, 22R are determined by the lateral positions of the respective followers 36L, 36R.

The guide plates can be moved together forward and backward by means of the driver's speed control 26. The fore-and-aft displacement of the two guide plates is always identical. The guide plates can also be rotated by means of the driver's steering control 24. The two guide plates are not rotated in unison. The movement of the guide plates, and the consequent manner of control of the transmissions, will now be explained with reference to the drawings.

Figure 2:
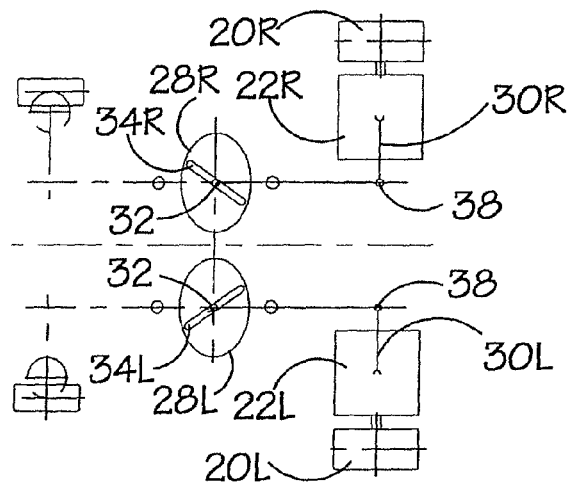

FIG. 2 shows a condition in which the steering control 24 is in its "straight ahead" position—i.e. is set to produce no turn. The two guide plates are in their default orientations, with the guide paths 34L and 34 R inclined to the fore-and-aft direction by equal but opposite angles, which in the present embodiment are approximately 45 degrees. The speed control is set to zero indicating a demand for zero wheel movement. This speed control setting causes the guide plates 28L, R to adopt a fore-and-aft position such that the followers 36L, R lie upon the rotational axes 32 of the guide plates 28L, R. This corresponds to positions of the actuating levers 30L, R in which they cause the transmissions 22L, R both to adopt the geared neutral state, in which they provide zero ratio and hence zero output speed, despite rotation of the engine. Because the followers are at the plates' rotational axes, any movement of the steering control cannot move the followers, and so does not cause rotation of the vehicle wheels. This is in accordance with the expectation of the driver, who is used to controlling speed with one control and steering with another.

Figure 3:
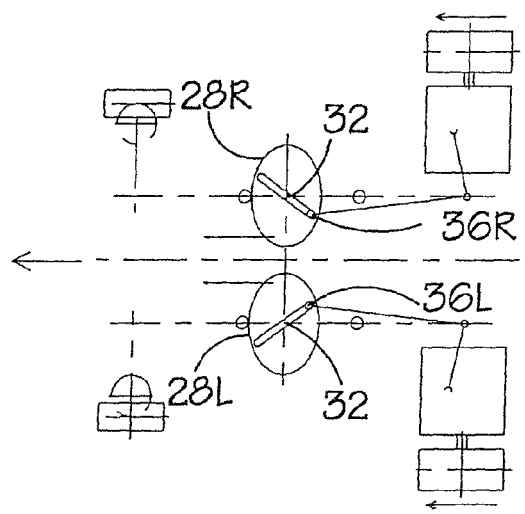

FIG. 3 shows the state of the system when the steering control 24 remains in the "straight ahead" position, but the speed control has been advanced by the driver, to the limit of its travel, to demand maximum forward vehicle speed. The two guide plates 28L, R have been correspondingly advanced which, due to the inclination of their guide paths, has displaced both followers laterally. Correspondingly the actuating levers 30L, R have been rotated, causing the transmissions 22L, R to adopt identical forward drive ratios, driving the vehicle forward in a straight line.

Figure 4:
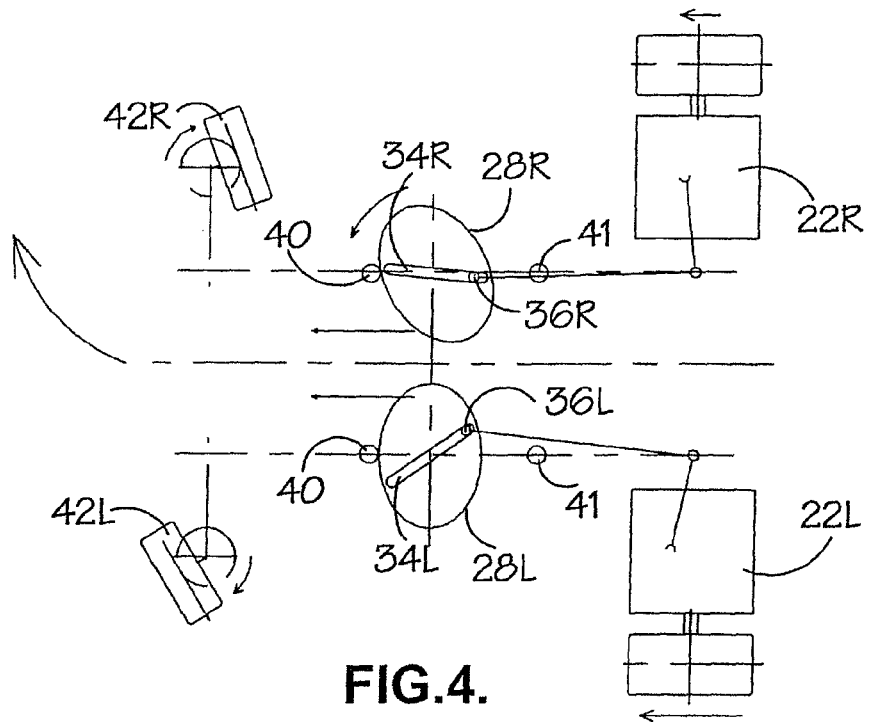

FIG. 4 shows what happens if the driver then turns the steering control to demand a turn to the right. A mechanism (not shown) coupling the steering control to the guide plates 28L, R causes the right hand guide plate 28R to rotate (in an anti-clockwise direction) but leaves the left hand guide plate in its normal position. The inclination of the path 34R in the right hand guide plate is reduced. Correspondingly the lateral displacement of its follower 36R, and the drive ratio from the associated transmission 22R, are reduced. The right hand wheel is driven more slowly, while the left hand wheel's speed is unchanged, and a right turn results.

Figure 5:
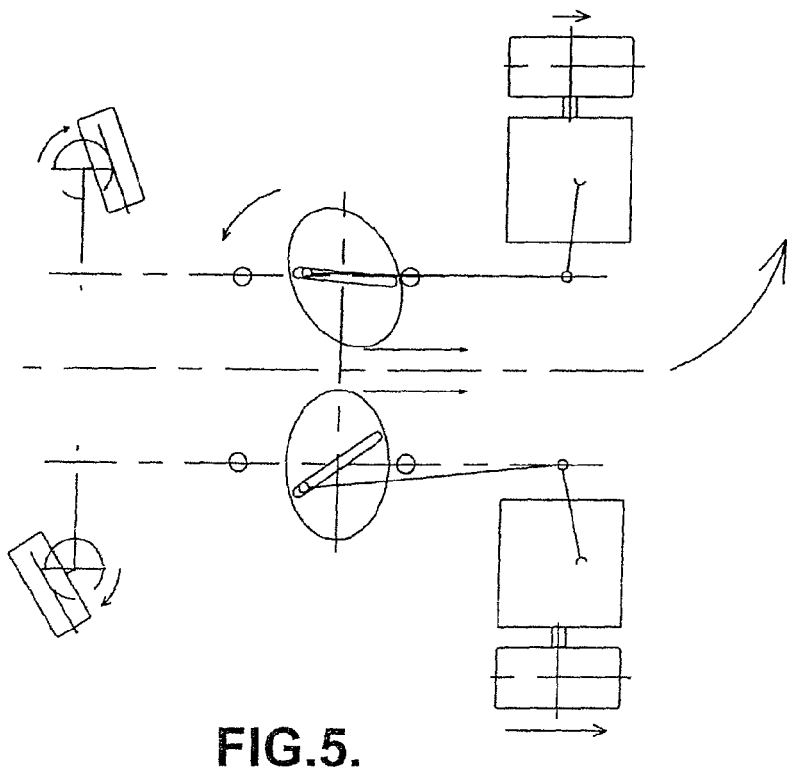

This turn is maintained regardless of the position of the speed control 26. In FIG. 5, the speed control has been moved by the driver to place the vehicle in reverse, while maintaining the setting of the steering control 24. The absolute speed of the right hand wheel remains smaller than that of the left hand wheel, so that the vehicle continues to turn to the right.

Figure 6:
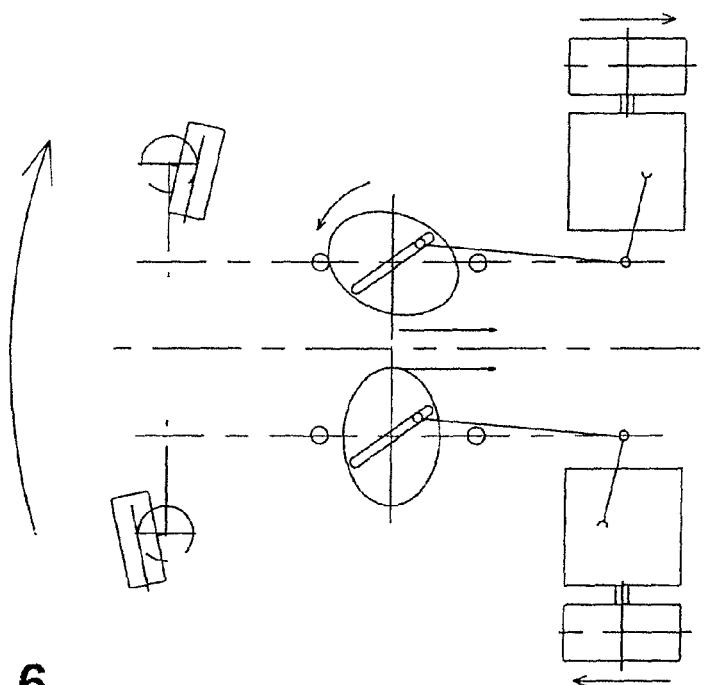
Figure 7:
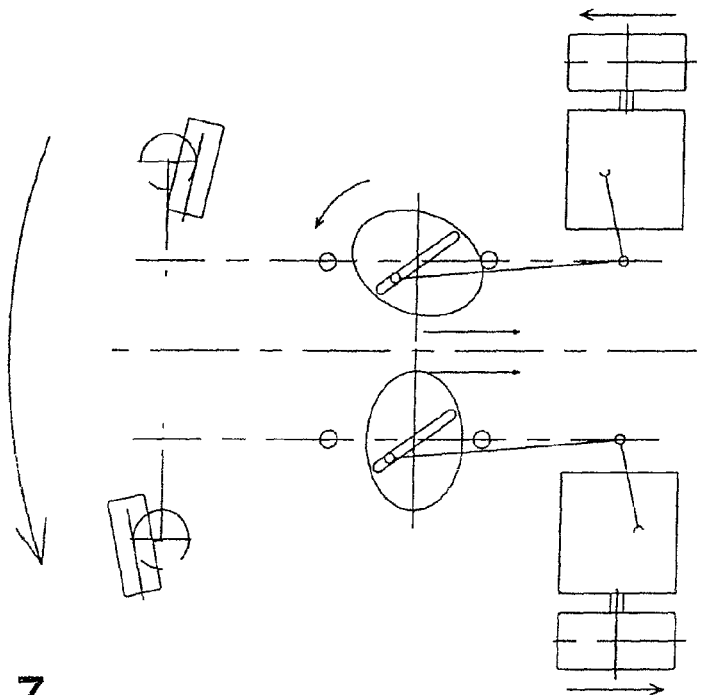

Turning the steering control still further, as in FIG. 6, causes the guide path 34 R to rotate beyond the point where it is parallel to the fore-and-aft direction. To put this another way, the angle of inclination of the guide path changes from positive to negative. Correspondingly, the direction of rotation of the right hand wheel is reversed. The two wheels thus rotate in opposite directions, producing a very tight radius of turn or even, where the right and left hand wheel speeds are equal but opposite as in the drawing, causing the vehicle to spin on the spot. With the steering control in this position, moving the speed control from forward to reverse—FIG. 7—changes the direction in which the vehicle spins.

The drawings all show the steering control 24 set either to "straight ahead" or "right turn" positions. However the effect of the control mechanism is symmetrical. If the control is turned to the left of the straight ahead position, then it causes the left hand guide plate 28L to rotate (in a clockwise direction, as viewed) to slow down the left hand wheel, leaving the right hand guide plate in its normal position.

The effect of this arrangement, as will be apparent, is that the positions of the levers 30L, R controlling the transmissions are each proportional to the speed control setting, but the constant of proportionality is determined by the respective steering control.

The vehicle's front vehicle wheels 42L and 42R are controlled (e.g. through a rack-and-pinion gear, as in conventional steering arrangements) by driver's steering control 24.

Figure 8:
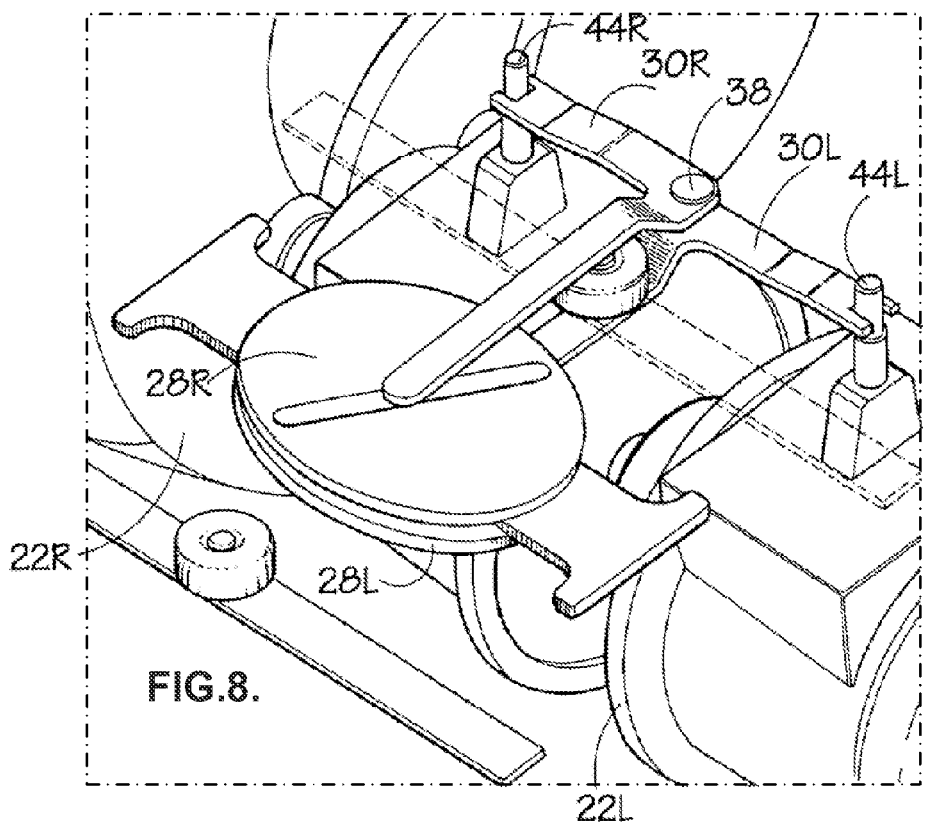
FIGS. 8 and 9 show, in perspective and from above and below respectively, a physical construction of the first arrangement.
Figure 9:
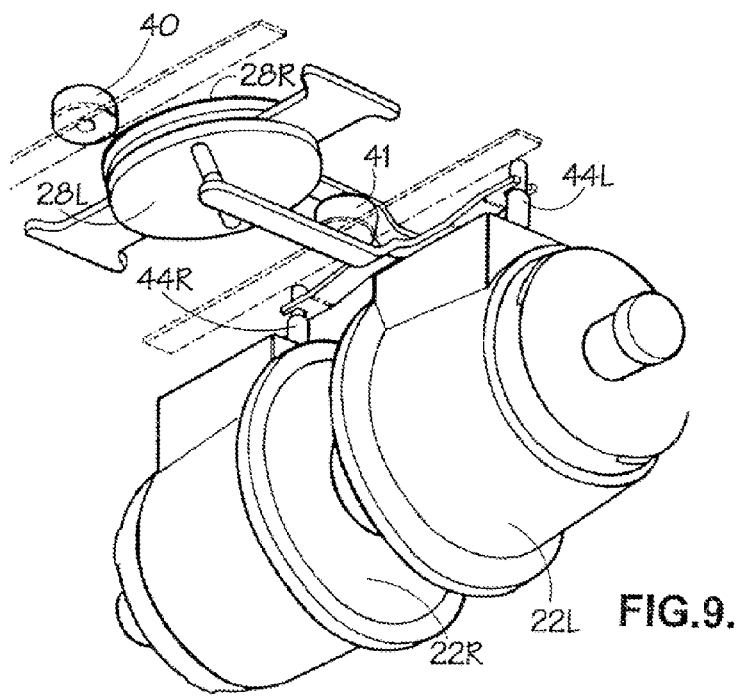

FIGS. 8 and 9 illustrate an actual mechanical embodiment of the control system schematically represented in FIGS. 1 to 7. The left and right hand transmissions are once more seen at 22L and 22R. They each have a projecting ratio-control lever 44L, 44R whose outer end is movable fore-and-aft to change the transmission's ratio. This outer end is located between a parallel pair of tines formed on the actuating lever 30L or 30R, so that the ratio-setting lever's position is determined by that of the actuating lever. The fixed fulcrum about which the actuating levers 30L, R rotate is formed as a pin 38 received in through-going bores in both levers. Other components of the arrangement have already been described and are given the same reference numerals here as in previous drawings.

Figure 10:
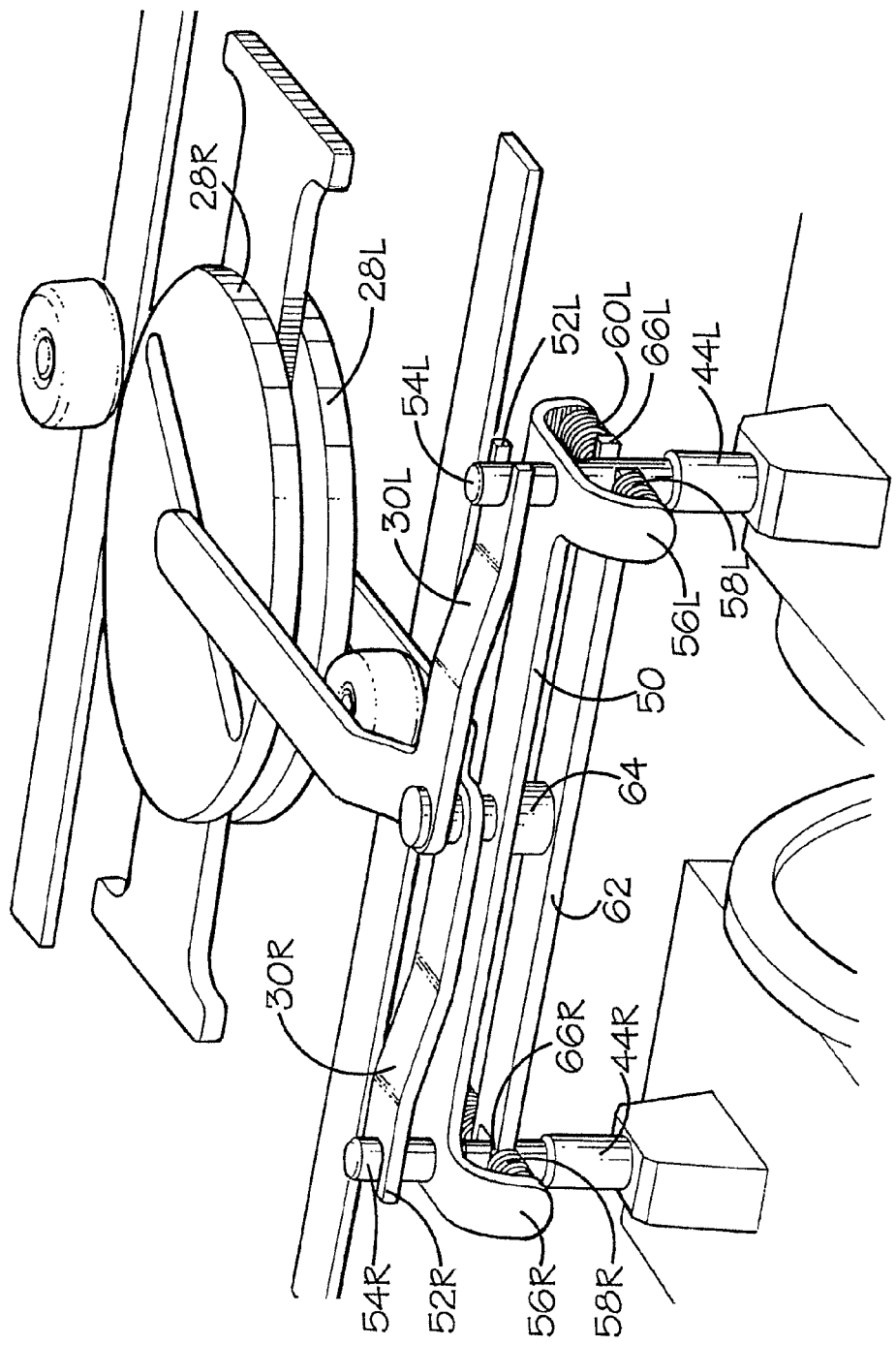
FIG. 10 shows a modified version of this arrangement in prespective.

As noted above, the arrangement described so far lacks compliance in the mechanical coupling between the steering control 24 and the transmissions 22L, R. FIG. 10 illustrates a modified version of the arrangement, embodying the present invention, in which this compliance is provided. The arrangement is in many respects identical to that described above and like parts are given the same reference numerals. The modification lies in the manner in which the left and right hand actuating levers 30L, R are connected to the respective ratio-control levers 44L, R. It is this connection which provides the desired compliance. A bridge bar 50 is connected to outer ends of both actuating levers 30L, R through tines 52L, R on the levers embracing studs 54L, R on the bridge bar 50. A connecting bar 62 is connected to the centre of the bridge bar 50 through a pivot 64, so that the two are capable of relative rotation about an axis which is vertical in the drawing. The connecting bar 62 extends between the two ratio control levers 44L, R and connects to both through pairs of parallel tines 66L, R which embrace the respective ratio-control levers. Pairs of downwardly curved lobes 56L, R upon the bridge bar serve in each case to mount an opposed pair of springs 58L, R and 60L, R. Opposite ends of the connecting bar lie between the respective pairs of lobes, and are acted on by the springs, so that the ends of the connecting bar (and the ratio-control levers to which they are connect) tend to move along with the levers 44L, R, but there is some freedom for relative motion of these parts by virtue of the springs.

Note that the position of the bridge bar 50, and hence of the pivot 64, is determined (without compliance) by the positions of the actuating levers 30L, R. Compliant motion of the ratio-control levers therefore involves rotation of the connecting bar 62 about the pivot 64, so that this compliant motion always involves the ratio-control levers moving in opposite directions. If one ratio-control lever moves forward, the other must move rearward by the same amount. Hence the average of the positions of the two levers is dictated by the mechanism without compliance. The difference in the lever positions is able to vary somewhat due to the compliance. In this way the speed difference between the left and right hand driven vehicle wheels is able to vary somewhat, but control over the vehicle speed is maintained.

An alternative control arrangement embodying the present invention will now be described. The principles can best be appreciated by reference to FIGS. 11 to 18. The arrangement is similar to that previously described in that continuously variable transmissions 122L, R are used to drive respective vehicle wheels 120L, R at independent, continuously variable ratios. However in place of the two guide plates of the previous embodiment, the present version has a single guide plate 128 which is rotatable by means of the steering control about a fixed axis indicated by the intersection of dotted lines in the drawings. A follower 136 is received in a guide path formed as a straight slot 134 in the guide plate 128, being thus constrained to move only back and forth along the slot, and this movement is controlled by the speed control. In the present embodiment, the movement is controlled by an opposed pair of Bowden type control cables leading to the speed control (see FIG. 12). Outer sheathes 150, 152 of the cables are led into bores in opposite end faces of the guide plate 128 and inner cables 151,153 are each coupled to opposite sides of the follower, thus acting in a "pull/pull" mariner. Other types of control cable, able to push as well as pull, would make it possible to use a single cable, but there are in any event numerous other mechanisms which could be used to couple the follower 136 to the speed control 126, one of which will be described below.

The follower 136 is mounted upon a fore-and-aft extending lever 130 pivoted about a fulcrum 158. A laterally-extending lever 156 is pivoted about the same fulcrum. An opposed pair of diagonally extending springs 157L, R, each connected at one end to the fore-and-aft extending lever 130 and at the other end to the laterally-extending lever 156, tends to maintain a right angle between the two levers. Opposite ends of the laterally extending lever 156 are operatively coupled to the respective transmissions 122L, R such that their fore-and-aft positions dictate the transmissions' ratios. In the drawings, uppermost ends of ratio-control levers of the transmissions are seen at 144L, R and are coupled to the lever's ends. The fulcrum 158 is not fixed. Instead it is able to move along the fore-and-aft direction in a fixed guideway 160. The arrangement is such that the follower's position dictates, subject to compliance from the springs 157L, R, the positions of the ratio-control levers 144L, R. Moving the follower forward increase both ratios. Moving it backward decreases both ratios. Lateral movement of the follower increases one ratio and decreases the other.

Figure 11:
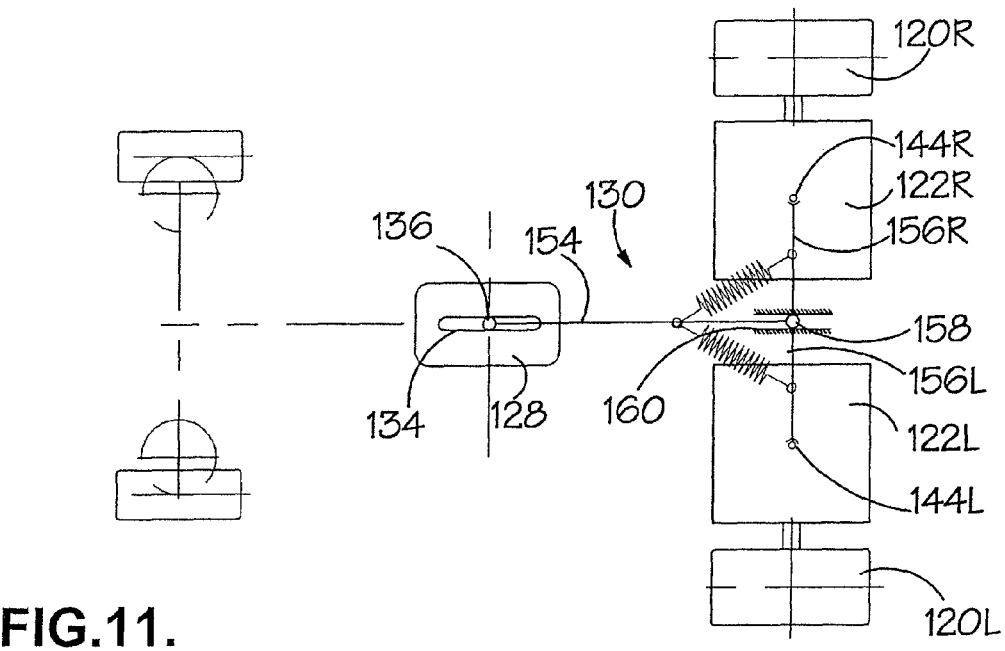
FIGS. 11 and 13-19 are highly schematic representations of a second steering and drive arrangement in accordance with the present invention.
Figure 12:
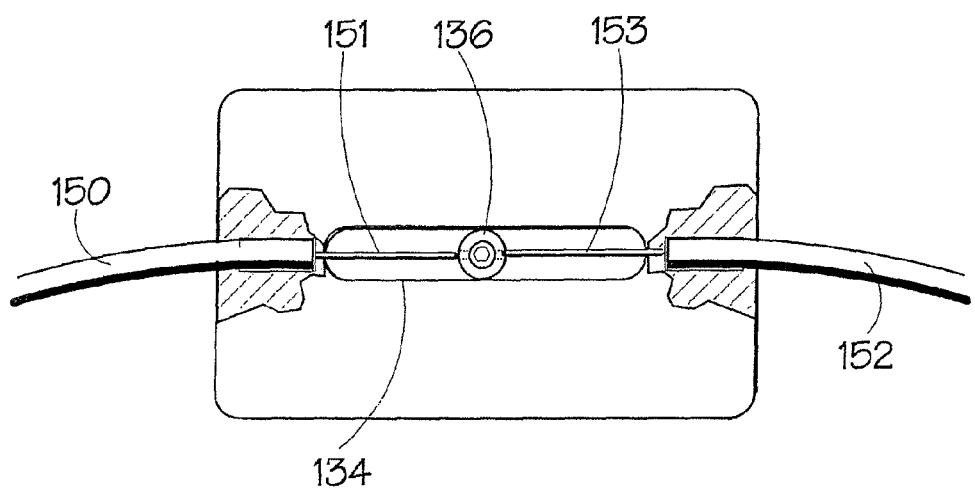
FIG. 12 is a schematic representation of a guide plate used in this arrangement.

The operation of this embodiment will now be described. FIG. 11 shows its configuration when the speed control is set to zero, causing the follower 136 to be positioned on the axis of rotation of the guide plate 128, and the steering control is in the "straight ahead" position, so that the slot 134 is aligned along the fore-and-aft direction. The ratio-control levers are both at their "geared neutral" positions so the vehicle is stationary. Because the follower 136 is on the axis of rotation of the guide plate 128, any rotation of the steering control 124/ guide plate 128 does not move the follower or change the geared neutral ratios of the transmissions, so nothing the driver does with the steering control alone will cause the vehicle to move.

Figure 13:
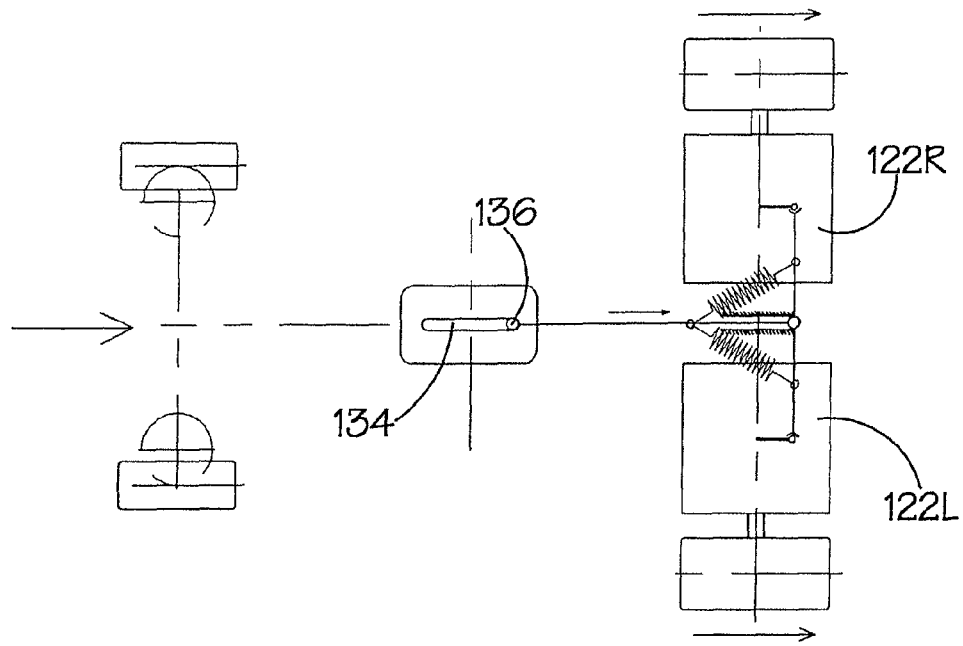
Figure 14:
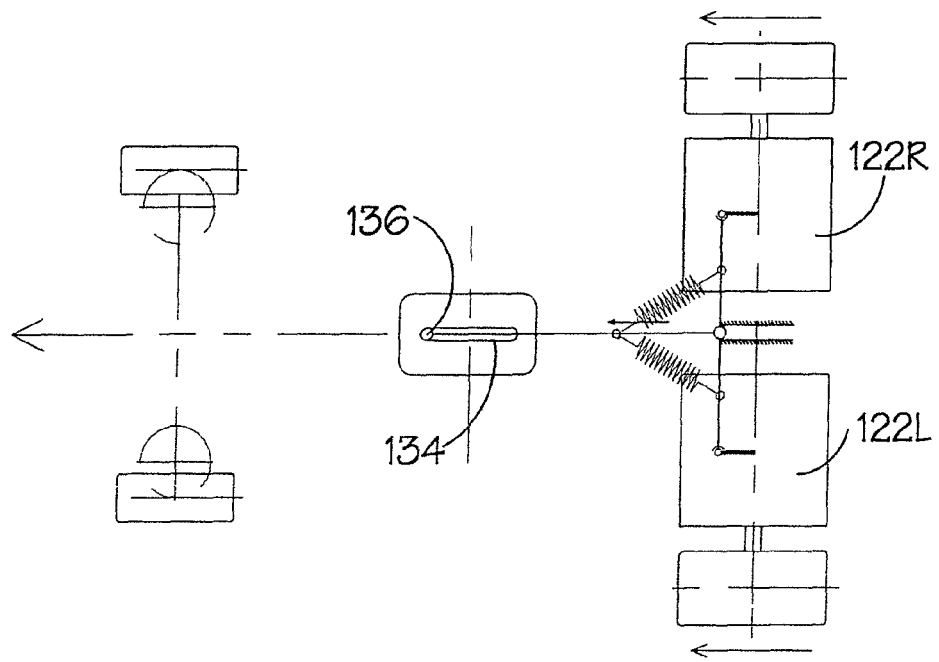

FIGS. 13 and 14 both show configurations in which the steering control 124 is set for "straight ahead". In FIG. 13 the speed control 126 has been moved to request maximum reverse speed, the follower 136 being correspondingly moved to the rear end of the slot 134. Consequently both ratio-control levers are displaced rearwardly by equal amounts, setting both transmissions 122L, R to the same reverse ratio. The vehicle moves backward in a straight line. In FIG. 14, the driver has moved the speed control 126 to request full forward speed, the follower 136 is at the front end of the slot 134 and the transmissions 122L, R are set to identical forward ratios. The vehicle thus moves straight ahead.

Figure 15:
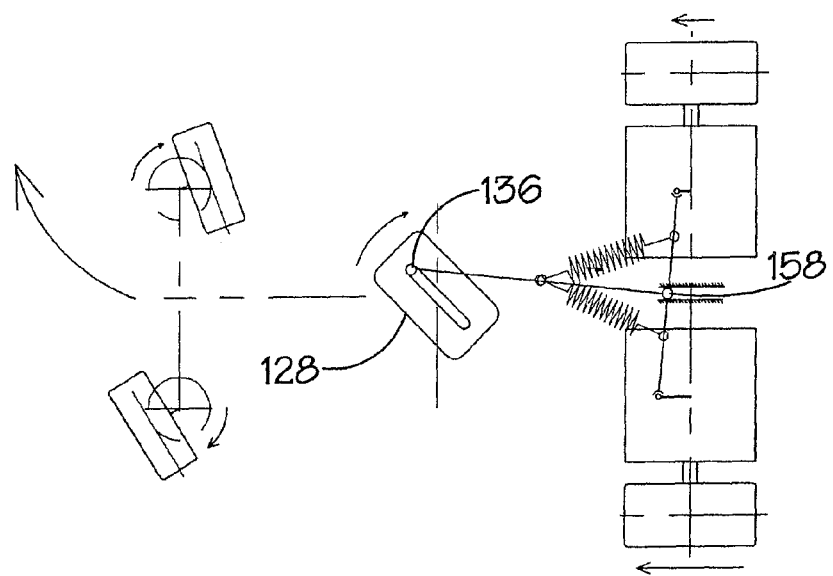
Figure 16:
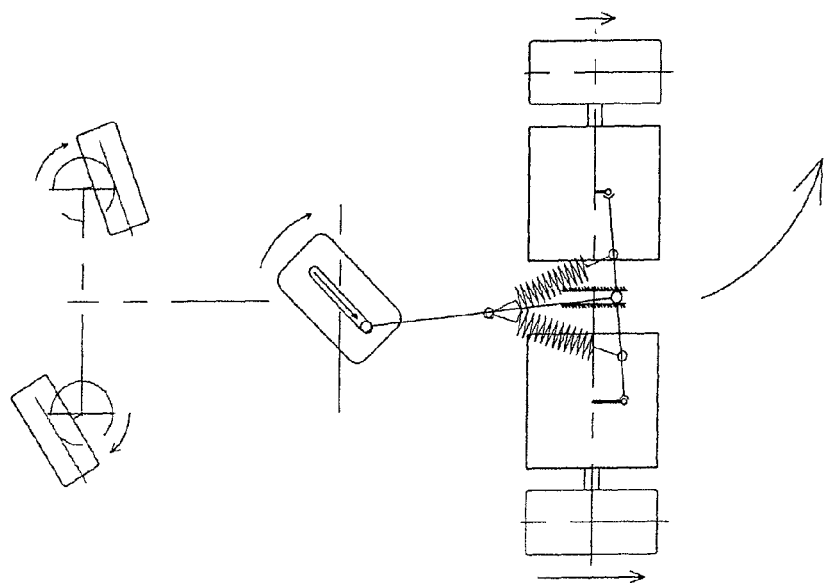

In both of FIGS. 15 and 16, the steering control has been set to require a right turn and the guide plate 128 has been correspondingly rotated (clockwise, as viewed). Due to the lateral displacement of the follower which results from the inclination of the guide slot 134, the lever has pivoted about its fulcrum 158 causing the ratio-control levers 144L, R to adopt different positions. It will be apparent that whether the speed control is set for forward (FIG. 14) or reverse (FIG. 15) the required right turn results.

Figure 17:
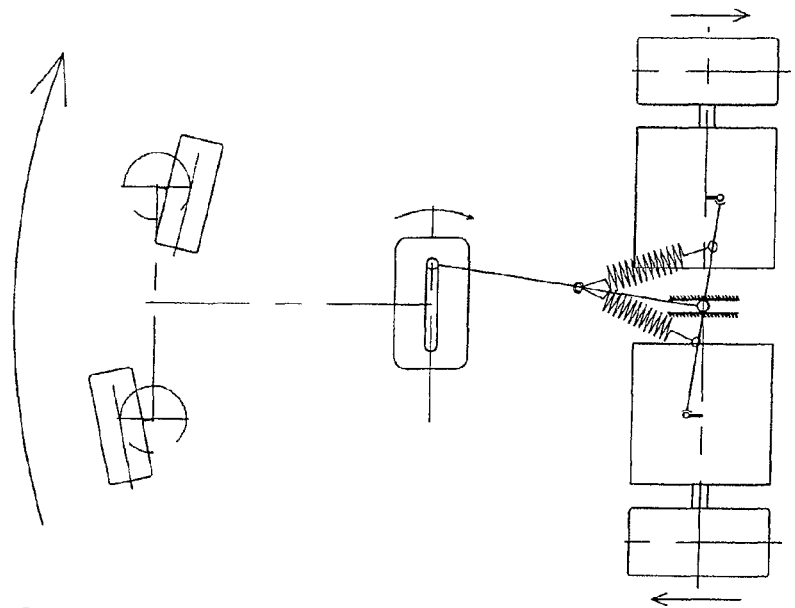
Figure 18:
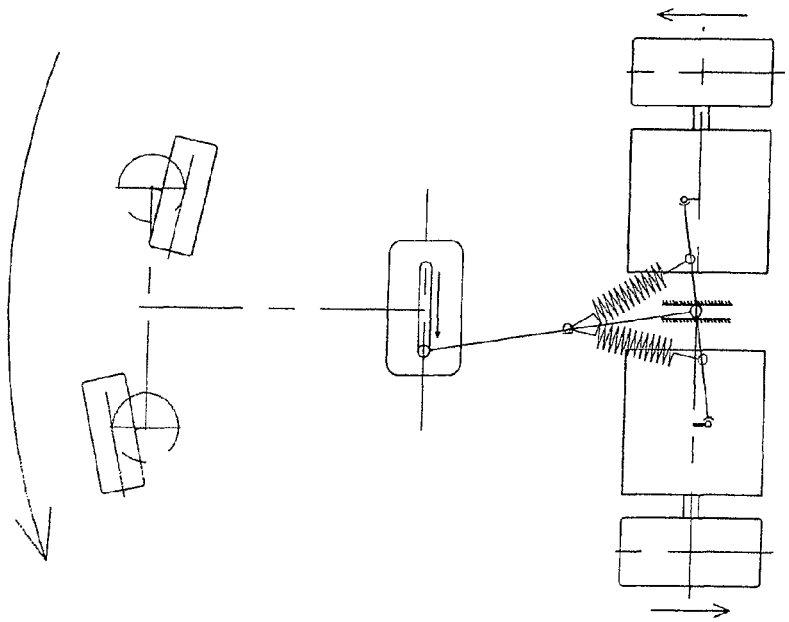

FIGS. 17 and 18 show that, with full lock on the steering control, the vehicle can be made to spin on the spot in either direction, depending on the setting of the speed control 126.

Figure 19:
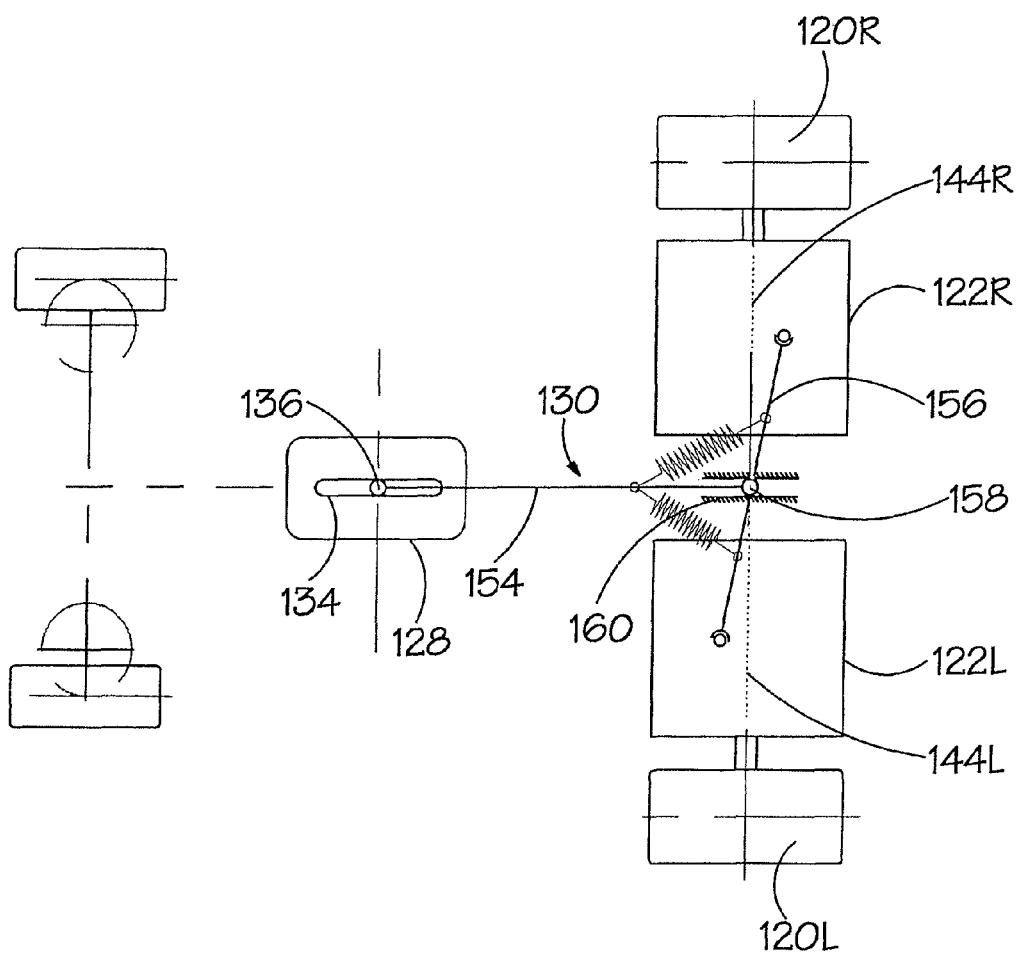

In all of FIGS. 11 to 18, the fore-and-aft extending lever 130 is perpendicular to the laterally-extending lever 156. However potential mismatch between the turn radii dictated by the driven wheels and by the steerable wheels is reduced or eliminated by slight relative rotation of these parts, against the springs 157L, R. In FIG. 19, the two levers are not precisely at a right angle. The compliant rotational movement of the laterally-extending lever 156 results, as in the previous embodiment, in equal but opposite movements of the ratio-control levers 144L, R.

Figure 20:
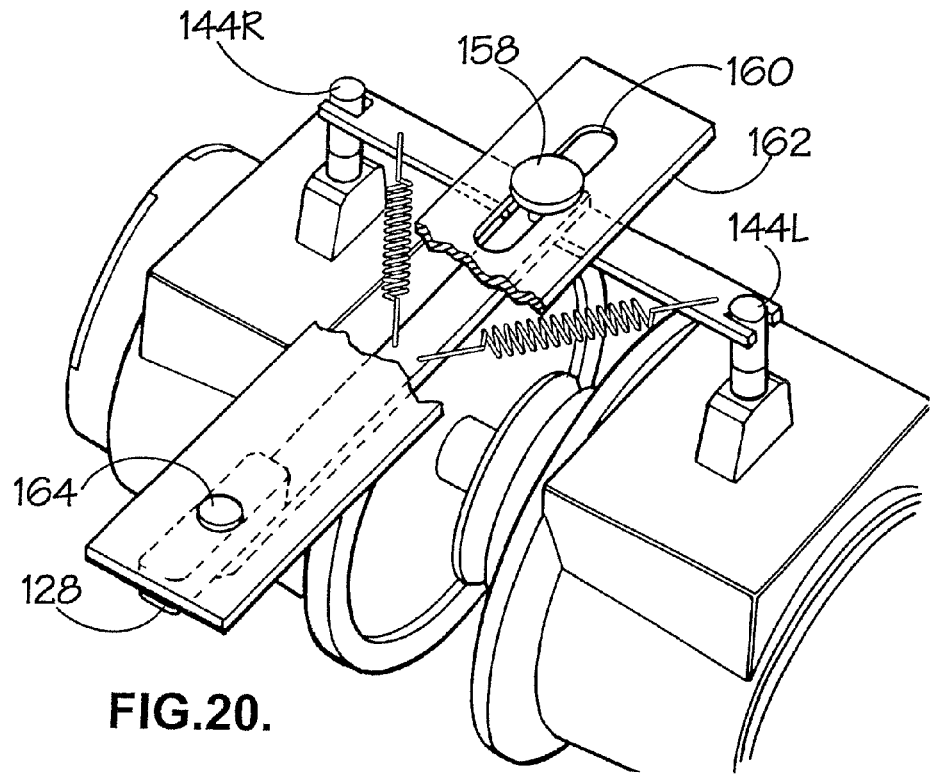
FIGS. 20 and 21 show, in perspective and from above and below respectively, a physical construction of the second arrangement.
Figure 21:
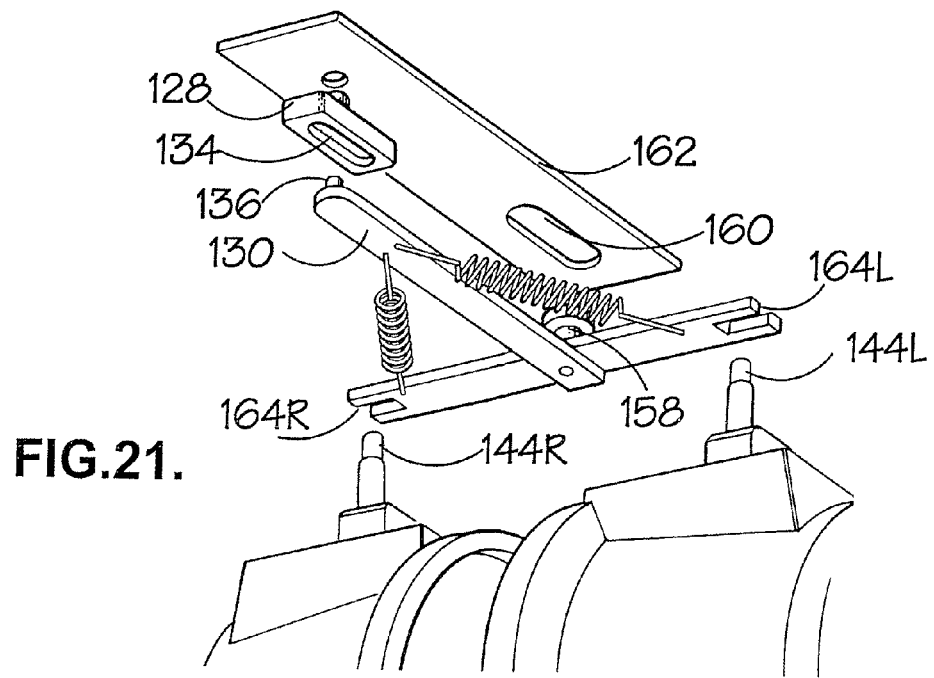
Figure 22:
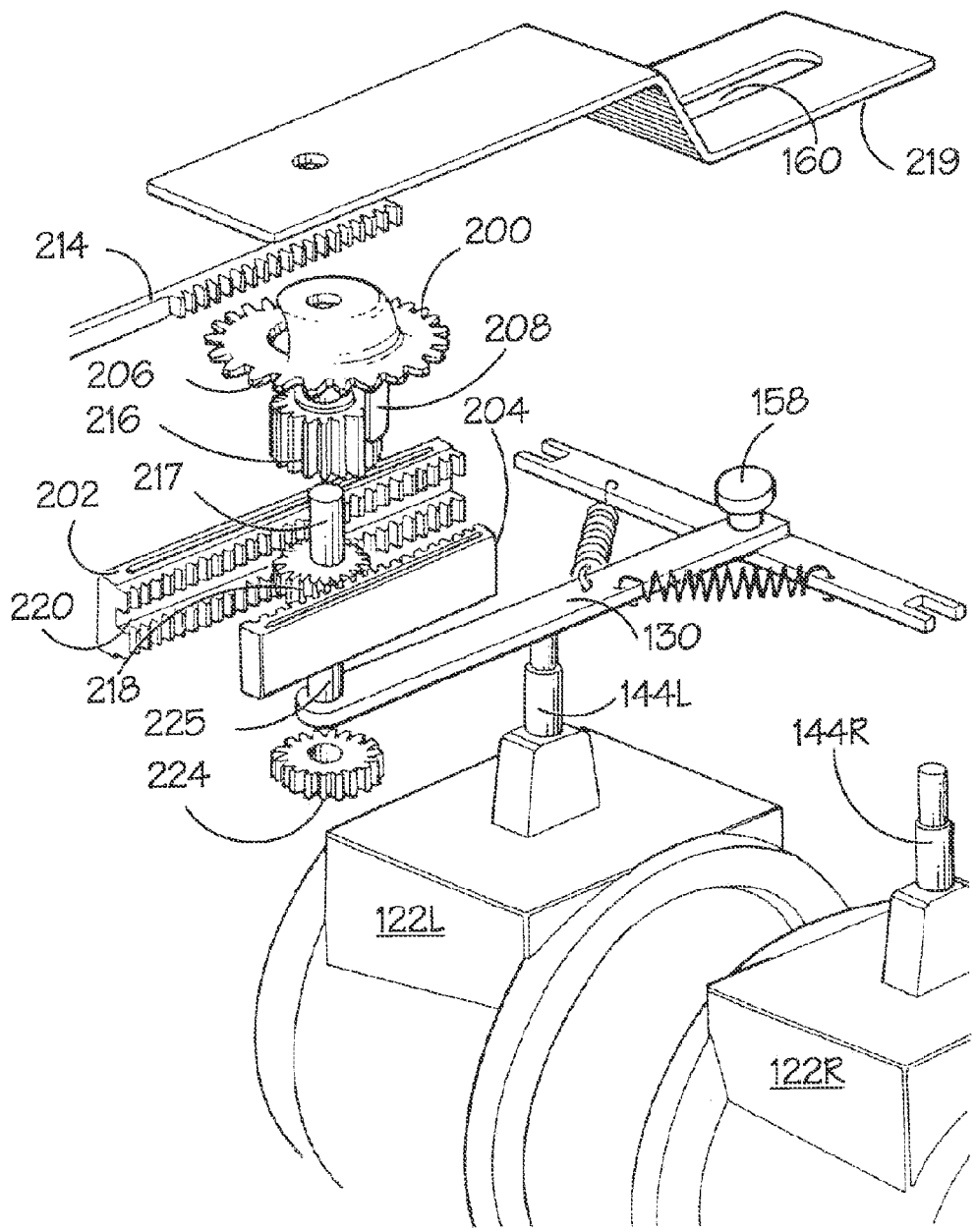
FIG. 22 is an exploded view of this construction.
Figure 23:
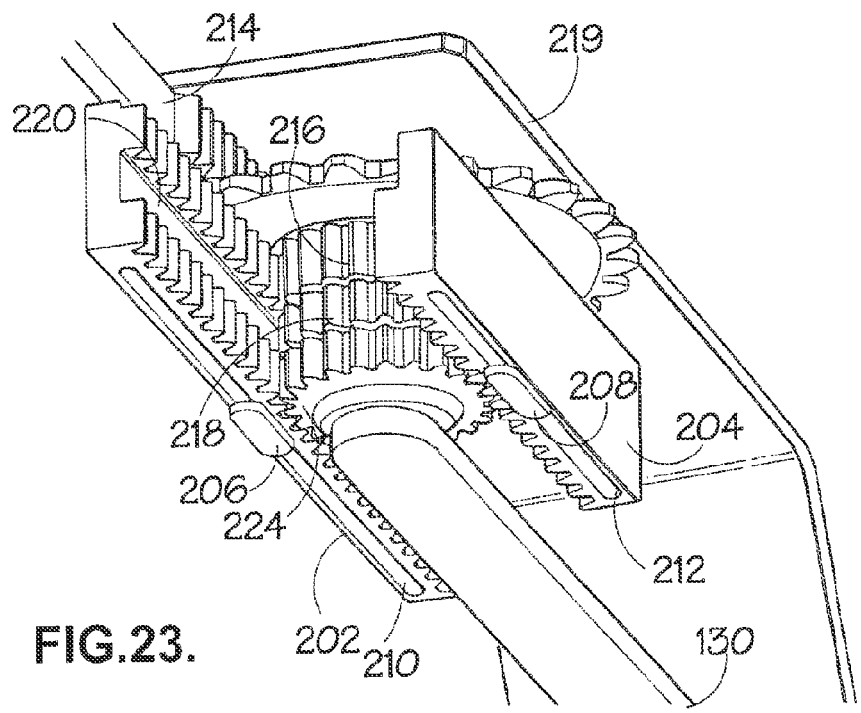
FIGS. 23 and 24 show the same construction in perspective, from below and above respectively.
Figure 24:
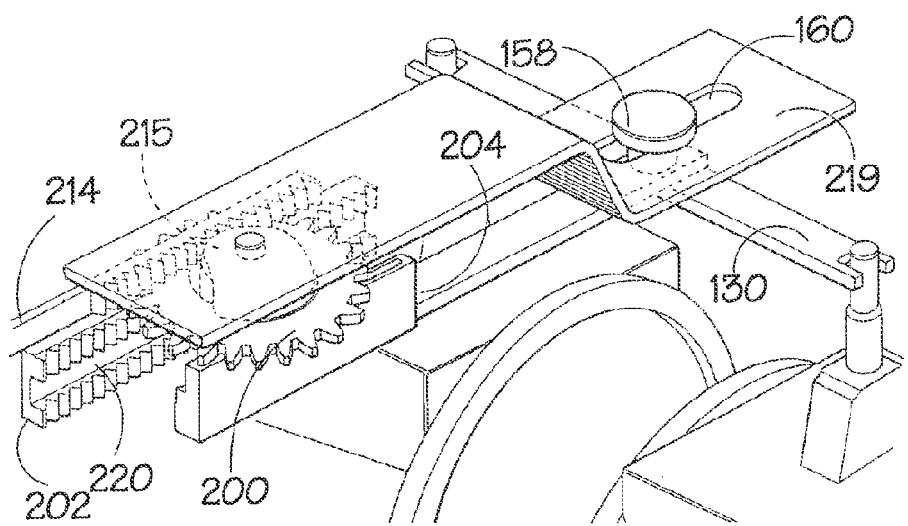

FIGS. 20 and 21 illustrate one possible construction of this type of arrangement. A mounting plate 162 has a fixed position in the vehicle, and receives a stub axle 164 formed on the upper surface of the guide plate 128 to pivotally mount the guide plate. The follower is formed as a stub 136 on the upper face of the "T" lever 130 running in a downwardly open slot 134 in the guide plate. The Bowden cable arrangement used to move the follower along the slot is omitted from these drawings. The fulcrum 158 is formed as a flanged spigot running in a through-going longitudinal slot in the mounting plate 162 forming the guideway 160. The fulcrum/spigot 158 is screwed to the upper face of the longitudinally-extending lever 130. Parallel tines 164L R on the left and right hand limbs of the laterally-extending lever 156 engage the ratio-control levers 144L, R of the transmissions 122L, R. The springs are again indicated at 157L, R.

It was mentioned above that there are alternative mechanisms for controlling the position of the follower along its guide path. FIGS. 22 to 25 illustrate one such alternative mechanism. Compared with the Bowden cable arrangement described above, this has the advantage of providing a positive mechanical connection between the controls and the follower. It uses movable racks to define the guide path and a pinion to form the follower, as will now be explained.

Gear wheel 200 is externally toothed to engage with a mechanism (omitted from the drawings for simplicity, but using a further gear or a toothed rack) leading to the driver's steering control. Movement of this control by the driver thus rotates the gear wheel 200. Master and slave toothed racks 202, 204 are coupled to the gear wheel 200 such that they turn along with it, but are capable of moving longitudinally relative to it. In the illustrated embodiments, this mounting is achieved through lugs 206,208 projecting from the gear wheel 200 and received as a sliding fit in longitudinal slots 210, 212 of the respective racks 202,204. A more sturdy and directionally positive arrangement will be described below. A speed control rack 214 is connected to, and movable along its longitudinal direction by, the d river's speed control, and meshes with a speed control pinion 216. Both the gear wheel 200 and the speed control pinion 216 are journalled on an axle 217 of a mounting pinion 218. The axle 217 is journalled in a mounting plate 219 such that it can rotate but its axis is fixed. The gear wheel 200 has a domed inner region into which the speed control pinion 216 projects, the dome being cut away to enable meshing of the speed control pinion 216 with the speed control rack 214. The mounting pinion 218 meshes with the slave rack 204 but runs in an un-toothed longitudinal recess 220 in the master rack 202, so that it does not restrict longitudinal motion of either rack—when the slave rack 204 moves, the mounting pinion 218 freewheels. The speed control pinion 216 meshes with the master rack 202, so that displacement of the speed control rack 214 produces a corresponding displacement of the master rack 202.

Follower pinion 224 meshes with lower regions of both master and slave racks. It is rotatably mounted on a stub axle 225 carried by a "T" shaped lever 130 of the type already familiar from FIGS. 11-21. The lever is, as before, provided with a fulcrum in the form of a spigot 158 movable along a guideway formed as a slot 160 in the mounting plate 219, and its left and right limbs are coupled to the control levers 144L, R of the transmissions 122L, R. Note that although the follower pinion 224 is shown to be co-axial with the mounting pinion 218 etc. in some of the drawings, it is able to move away from this position in response to input from the driver's speed control.

Hence the longitudinal position of the master ack 202 is controlled by the speed control pinion 216. The longitudinal position of the slave rack 204 is controlled by the mounting pinion 218. Moving the master rack 202 changes the radial position of the follower 214—i.e. its distance from the axis about which the racks turn (which is the axis of the axle 217). However, turning the racks about this axis causes one rack to advance and the other to retreat, leaving the radial position of the follower unchanged.

The operation of this arrangement is analogous to that of the embodiments illustrated in FIGS. 11-21. The racks together form a guide path which is rotatable, about a fixed axis defined by the axle 217, by means of the steering control. The radial position of the follower 224 (i.e. the distance of its centre from the fixed axis) is unchanged by rotation of the guide path and depends only on the position of the speed control rack 214. This will now be illustrated with reference to FIG. 25.

Figure 25A:
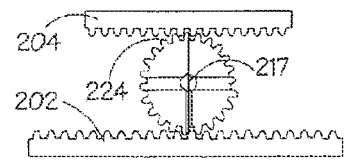
FIGS. 25 *a-e* represent, in highly schematic form, various configurations which this construction can adopt in use.

FIG. 25a shows the configuration when the speed control is at zero and the steering control at "straight ahead". The axis of the follower pinion lies on the fixed axis 217, and correspondingly the lever 130 (omitted from FIG. 25 for the sake of representational simplicity) is positioned to place both transmissions in geared neutral.

Figure 25B:
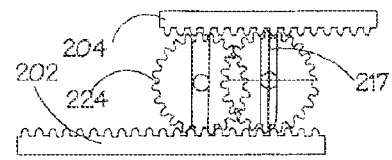

FIG. 25b shows the configuration where the steering control remains at zero (the orientation of the master and slave racks 202, 204 is the same as in the previous drawing) but the speed control rack 214 (not seen in these drawings) has been advanced, and this motion has been transmitted through the speed control pinion 216 to the master rack 202. Consequently the follower pinion 224 has been displaced forwards (in a direction form right to left in the drawings) from the fixed axis 217. As in previous embodiments, the effect of this forward displacement is to set the two transmissions to identical forward ratios, causing the vehicle to move in a straight line.

Figure 25C:
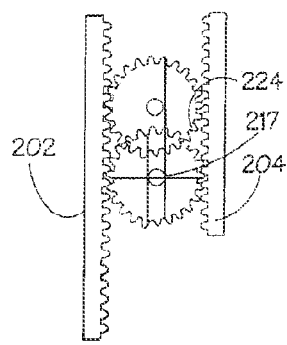

If the speed control setting of FIG. 25b is maintained, but the driver moves the steering control to request a right turn, the configuration of FIG. 25c is reached. The master and slave racks 202,204 have turned clockwise through ninety degrees. In the process, both master and slave racks have rotated around their pinions—the fixed mounting pinion controlling the slave rack 204 and the speed control pinion 216 controlling the master rack 202—causing them to move equally and in opposite directions. Consequently the radial displacement of the follower pinion 224 from the fixed axis 217 is unchanged. The follower pinion is now displaced laterally relative to the vehicle (upwards, as viewed in the drawings) to produce a right turn.

Figure 25D:
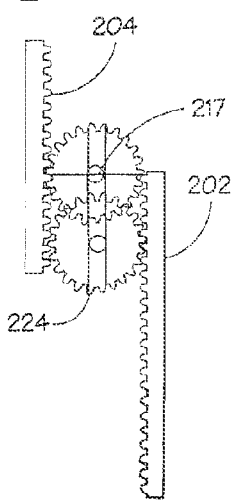

Still maintaining the same speed control setting, but moving the steering control to request a left turn, results in the configuration of FIG. 25d. Compared to FIG. 25B, the racks have moved ninety degrees anti-clockwise. Again the radial displacement of the follower pinion 224 is unchanged.

Figure 25E:
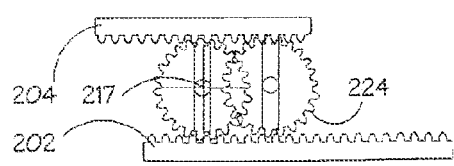

FIG. 25e shows the configuration when the steering control is set to zero but the speed control rack is withdrawn to move the follower pinion 224 rearwards relative to the vehicle (to the right in the drawing), setting both transmissions to identical reverse ratios and causing the vehicle to reverse in a straight line.

Figure 26:
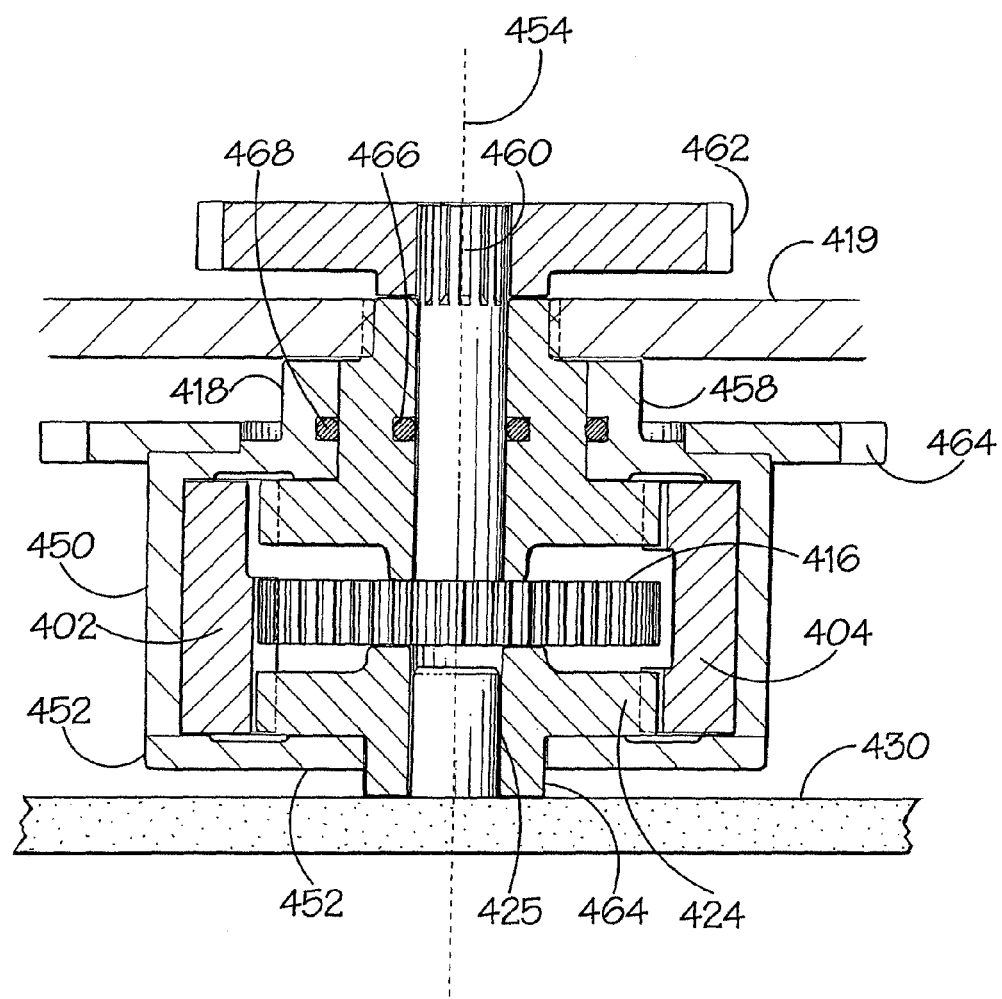
FIG. 26 is a sectional illustration of a third steering and drive arrange embodying the present invention.

FIG. 26 illustrates an arrangement which is largely functionally equivalent to that of FIGS. 22-25 but is more convenient in terms of assembly. The arrangement once more has a master rack 402 and a slave rack 404 but in this embodiment the racks are received and mounted by a two part housing 450, 452. The housing and the racks are able to rotate around axis 454. Mounting pinion 418 is spatially fixed through an integral boss 456 which is splined into mounting plate 419. Housing part 450 has an integral collar 458 through which the housing is rotatably mounted upon the aforementioned boss 456. Running through an axial bore in the mounting pinion 418 is an integral shaft 460 of a speed control pinion 416, the shaft being splined into an upper gear 462 through which speed control is exercised. The upper gear 462 is coupled to the driver's speed control through an arrangement (not shown) using either a chain or a further toothed rack. Rotation of the housing 450, 452 and of the racks it mounts is controlled through a steering gear 464 which is carried upon the housing and coupled to the driver's steering control through an arrangement (not shown) using either a further gear, a chain or a further toothed rack. A follower pinion 424 receives in an axial bore a stub axle 425 through which is mounted upon and serves to move a "T" shaped lever 430 coupled to the transmissions in the manner hereinbefore described with reference to FIGS. 21-24. The follower pinion 424 meshes with both master and slave racks 402, 404. Speed control pinion 416 meshes only with the master rack 402, so that moving this pinion, by means of the speed control, moves the follower pinion 424 radially. Fixed mounting pinion 418 meshes only with the slave rack 404 to ensure that when the housing rotates, the slave rack retreats to compensate for the advance of the master rack, so that rotation of the housing does not in itself change the radial position of the follower pinion 424.

Assembly of this arrangement involves placing all of the relevant parts in housing part 450, then adding housing part 452 to keep them in place. Note that although it is not apparent from the drawing, the housing 450, 452 forms an elongate enclosure containing the full length of the racks and leaving them room to move longitudinally. Stub axle 425 and a projecting hub 464 surrounding it project through an elongate slot in the housing part 452 to give them freedom to move longitudinally. Seals including "O" ring seals 466, 468 retain lubricant in the housing 450, 452. Mounting the housing assembly on the mounting plate 419 is achieved by inserting the shaft 460 through its hole in the mounting plate and securing the upper gear 462 in place upon the shaft 460 to resist its subsequent withdrawal.

Figure 30:
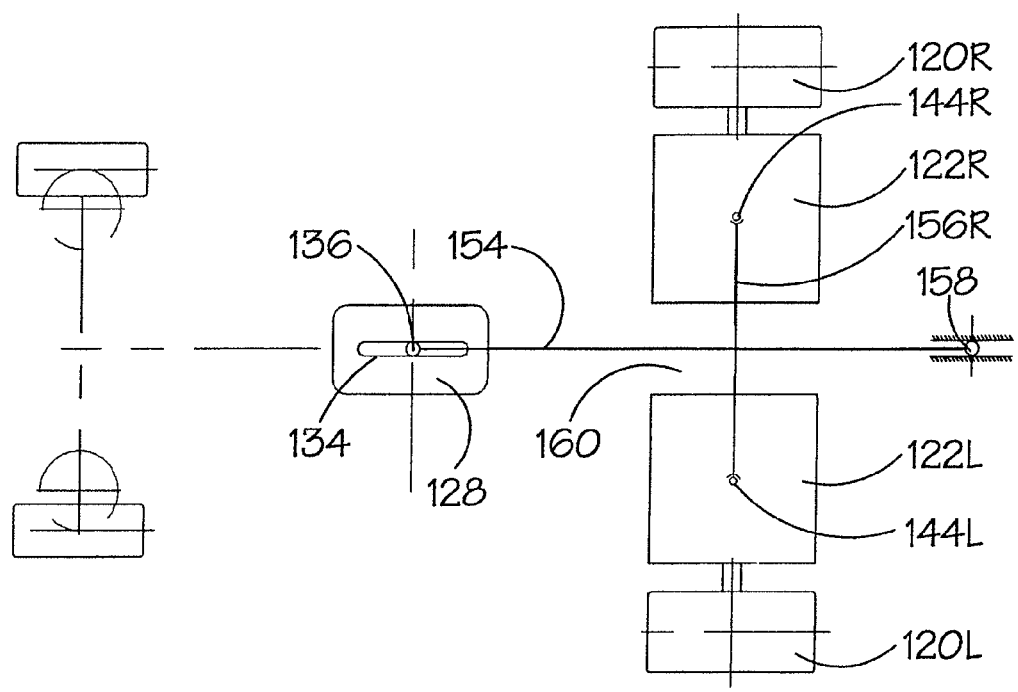
FIG. 30 is a schematic representation of yet another steering and drive arrangement embodying the present invention.

FIG. 30 illustrates a variant of the lever arrangement of FIGS. 11-21. Components are given the same reference numerals in FIG. 31 as in the earlier drawings. In FIGS. 11-21 the movable fulcrum 158 lies on a line joining the ends of the lateral limbs 156L, R of the lever 130—i.e. it lies at the junction of the "T" shape of the lever. However in FIG. 31 the fulcrum 158 is positioned away from this line, on the far side of it from the follower 136. The effect of the change is to modify the relationship between follower position and transmission ratios, and such adjustments to the geometry allow a desired steering characteristic to be achieved.

It will be apparent that in all of the above described embodiments, the speed control determines the radial distance of the follower or followers 36L, 36R, 136 from the axis about which the guide path 34L, 34 R, 134 rotates. The displacement of the follower produced by moving the steering control is a function of this radial distance. Rotating the guide path causes the ratio of one transmission relative to the other to change, whereas moving the follower along the guide path changes both ratios in the same sense.

As already explained, the driven vehicle wheels and the steerable wheels work in unison to cause the vehicle to turn. The steering characteristics (steering control position vs vehicle turn radius) of (a) the transmission arrangement and (b) the arrangement controlling the steerable wheels (typically of a type having the well known Ackermann geometry) should preferably be matched. This can in principle be achieved through modification of either arrangement.

Figure 31:
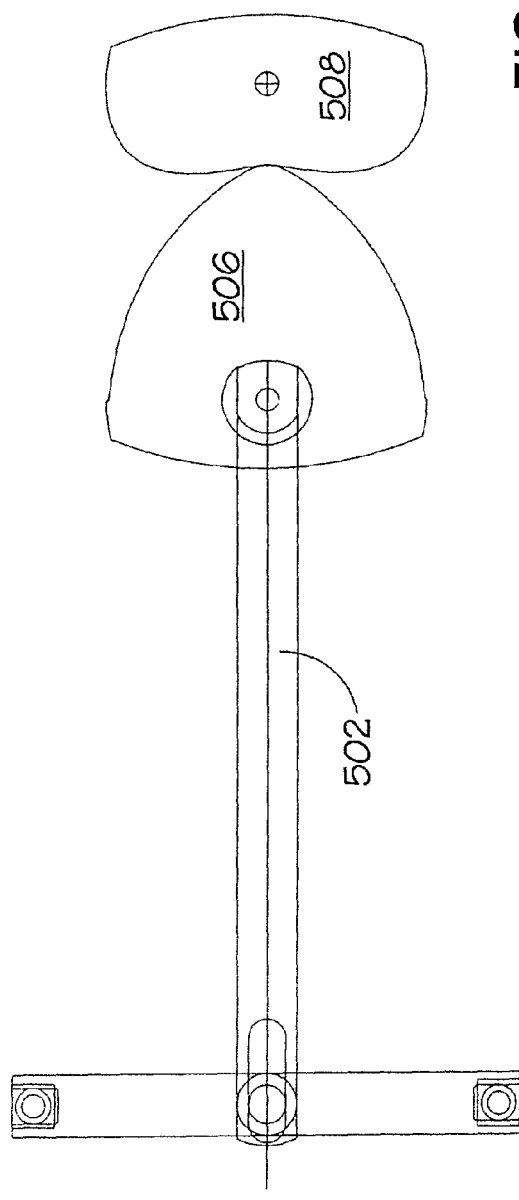
FIGS. 31 and 32 are plan and side views of yet a further steering and drive arrangement embodying the present invention.
Figure 32:
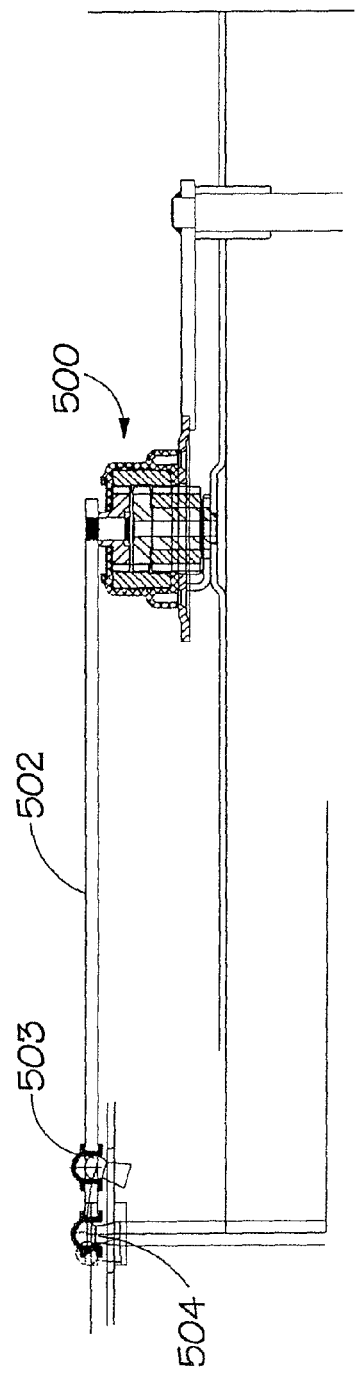

FIGS. 31 and 32 show a version of the transmission arrangement designed to match the characteristics of an Ackerman type steering gear. The mechanism seen at 500 is of the same general type seen in FIG. 30, and serves to control the position of a "T" shaped lever 502 which is the equivalent of the lever 130 seen in FIGS. 20-24. Note that in this embodiment the outer ends of this lever couple to the ratio control levers of the variators (which are not seen in this drawing) through spherical heads 503 received in complementarily shaped slots 504, which is a slight modification of the version described earlier. However the major difference of the present arrangement concerns an arrangement of gears 506, 508 through which the mechanism 500 is coupled to the driver's steering control. The gear wheel 506 serves the same purpose as gear wheel 200 seen in FIGS. 22 to 24: it serves to rotate the mechanism 500 and so, by turning the lever 502, to provide the required steering effect. The driver is able to turn the gear wheel 506 by means of the steering control (not seen in this drawing), which is operatively coupled to steering gear 508 which in its turn meshes with the gear wheel 506. Gear wheel 506 and steering gear 508 are non-circular, and their shapes are chosen to provide the required relationship between the position of the driver's steering control and the ratios provided by the two transmissions. The determination of the shapes required for the two gears is a straightforward numerical exercise based upon the characteristic (steering control position vs vehicle turn radius) of the Ackermann steering device and the characteristic (ratio control lever position vs ratio) of the transmissions. In the present embodiment this yields a shape for the gear wheel 506 which has three curved sides, as seen. The gears are shaped to remain in mesh at all times, so that the shape of one determines the shape of the other.

Figure 29:
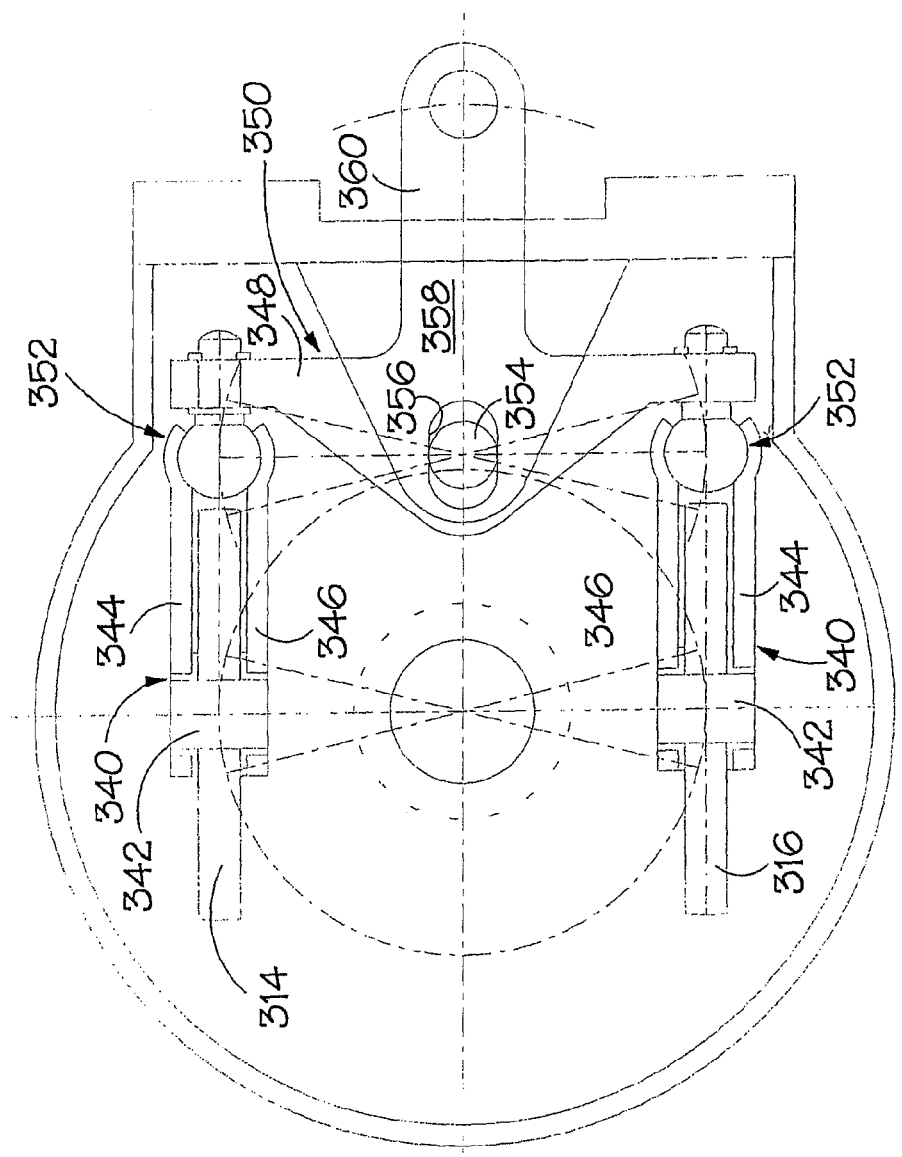
FIG. 29 is a cross-sectional view of the same transmission looking in the direction of arrows III-III.

FIGS. 27, 28 and 29 depict the construction of a continuously variable ratio transmission (CVT) which is suitable for use in implementing the present invention. This particular transmission is of toroidal-race, rolling-traction type, although other types of transmission construction are in principle able to be operated in accordance with the present invention. For an example of a "belt and sheave" type transmission which could be used in this context, the reader is referred to Torotrak (Development) Limited's European patent 0736153 and its U.S. Pat. No. 5,766,105.

The illustrated CVT comprises a variator V having a toroidally-recessed input disc 310 and a facing toroidally-recessed output disc 312. Two rollers 314, 316 are mounted in the toroidal cavity defined between the opposing toroidally-recessed faces of the input and output discs 310, 312 to transmit drive from the input disc 310 to the output disc 312 with a ratio which is variable by tilting the rollers 314, 316.

The input disc 310 is connected to, and rotates with, a transmission input shaft 318 which is driven from the vehicle's engine 319. The variator V provides an output via a tubular output shaft 320 which is connected to the output disc 312 and arranged coaxially with, and around, the input shaft 318. The input shaft 318 and the variator output shaft 320 provide the inputs to a compound mixing epicyclic gear train E1. As shown schematically, the end of the variator output shaft 320 remote from the output disc 312 carries a first sun gear S1 of the mixing epicyclic gear train E1. The carrier C1 of the gear train E1 is connected to, and driven by, the input shaft 318. The carrier C1 carries four identical equally-spaced radially inner planet gears P1 and four identical equally-spaced radially outer planet gears P2 (not visible in FIG. 1) of the same size as the radially inner planet gears P1. The radially inner planet gears P1 engage with the first sun gear S1 and with a respective one of the four radially outer planet gears P2. The radially outer planet gears P2 also engage with an internally-toothed annulus A1, which forms the output of the mixing epicyclic g ear train E1. The output from the annulus A1 is connected via tubular coaxial output shaft 322 to a simple reducing epicyclic gearset E2. The reducing epicyclic gearset E2 comprises an input sun gear S2 carried by shaft 322 which meshes with four equally angularly spaced planet gears P3 carried by carrier C2. The planet gears P3 also mesh with an annulus A2 fixed to the transmission housing. The rotation of the carrier C2 forms the output of the reducing epicyclic gear set E2 and is transmitted to the exterior by an output shaft 24 which is connected to the carrier C2. The output shaft 324 is coaxial with the input shaft 318, one end of which is received in a recess 326 in the innermost end of the output shaft 324. The output shaft 324 is coupled to the relevant driven vehicle wheel such as 20L, R.

The transmission is housed in a generally tubular casing 330 which supports the input and output shafts 318, 320. The end of the casing 330 adjacent the input shaft 318 is closed off by means of an end plate 332. A conical Belleville spring washer 334 extends between the inner face of the end plate 332 and an annular bearing plate 336 which is in rolling contact with an outer planar face of the variator input disc 310. The Belleville spring washer applies a force (an "end load") to the input disc 310 and permits torque to be transmitted form the input disc 310 via the rollers 314, 316 to the output disc 312.

By varying the inclination of the two rollers 314, 316 (as will be discussed below), the speed of the output disc 312 relative to the input disc 310 can be varied. By combining the rotations of the transmission input and variator output in the mixing epicyclic gear train E1, the output of the transmission can be varied. In the arrangement illustrated, the transmission can be varied between full reverse, through "geared neutral" to full forward. However, by appropriate selection of the gearing the operating range of the variator can be tailored to requirements. For example, the variator may be arranged to vary between low reverse through geared neutral to high forward overdrive if a vehicle to which the transmission were fixed normally operated in forward gear and only operated occasionally in reverse.

The mechanism for varying the inclination of the two rollers 314, 316 is shown in more detail in FIG. 28. Each roller 314, 316 is rotatably mounted in a roller carriage 340 by means of a stub axle 342 which is rotatably mounted in opposed planar support plates 44, 46 of the roller carriage. One end of each of the roller carriages 340 is connected to a respective one of the two ends of the cross-bar 348 of a control lever 350 by means of a spherical bearing 352 (e.g. a "Rose bearing" manufactured by Rose Bearings Limited). The control lever 348 is provided with a pivot pin 354 located midway between the centre points of the two spherical bearings 352. The pivot pin is received in a slot 356 of the same width as the diameter of the pivot pin but elongated in the radial direction with respect to the rotational axis of the variator. The slot 356 is provided in a mounting lug 358 which projects into the variator into the space between the input and output discs 310, 312.

The lever 350 is provided with an actuating arm 360 which projects out of the variator housing in a direction perpendicular to the line joining the centre points of the two spherical bearings 352 (i.e. perpendicular to the axis of the cross-bar 348 of the lever). This arm 360 forms the lever through which the transmission ratio is controlled and corresponds to the ratio control levers 44L, R and 144L, R described in connection with FIGS. 8-10 and 20-22. As the lever 350 pivots, one of the rollers 310, 312 is pushed and the other is pulled, both with equal torque. The mounting of the pivot pin 354 within the slot 356 in the mounting lug 358 allows the pin 354 to move radially inwardly and outwardly, which ensures that the horizontal forces from the rollers are equalised and cancel each other out. This is important in low-cost assemblies, where the manufacture of the components is likely to be less accurate. The radial movement of the pivot of the lever allows the lever to move to a position in which any imbalance between the two rollers which arises from manufacturing differences will be cancelled out.

It will be apparent that when drive is transmitted the rollers are subject to a net torque tending to drive them circumferentially about the variator axis. This torque must be reacted to a fixed point for the rollers to hold steady positions. The necessary reaction torque is provided by means of the lever 360, so that (as previously explained) the force upon the lever is related to the torques at the transmission input and output. When for example one wheel tends to lag behind the vehicle speed, in a way that could otherwise cause it to slip, the effect is to change the force upon the lever such as to tend to increase the speed of the relevant wheel. By permitting this adjustment, the arrangements embodying the present invention reduce or even eliminate wheel slip.

The invention claimed is:

1. A transmission arrangement for a motor vehicle, the arrangement comprising:
    a speed control actuable by a driver of the vehicle;
    a first variator defining a continuously variable ratio device coupled between the engine and a right hand vehicle wheel and serving to determine a first drive ratio at which the right hand vehicle wheel is driven by the engine; and
    a second variator defining a continuously variable ratio device coupled between the engine and a left hand vehicle wheel and serving to determine a second drive ratio at which the left hand vehicle wheel is driven from the engine, wherein
    each variator being configured such that a reaction torque from each variator is reacted through a respective movable ratio control part whose position governs the respective first or second drive ratio,
    the control parts of the first and second variators are each operatively coupled to the speed control, such that the speed control determines a mean position of the two control parts,
    each of the control parts is able to move relative to the mean position under the influence of the reaction torque to which that control part reacts, and
    the control parts are coupled to each other such that any displacement of one control part from the mean position is accompanied by an opposite displacement of the other control part, so that through the speed control the driver has control over overall vehicle speed, but a difference between the first and second drive ratios is able to vary to accommodate differences in speed of the left and right driven vehicle wheels.

2. A transmission arrangement as claimed in claim 1, further comprising a steering control which is actuable by the driver and which acts upon the first and second ratio control parts to influence their displacements from the mean position.

3. A transmission arrangement as claimed in claim 2, wherein each of the ratio control parts is able to move, under the influence of the torque which it reacts, through a limited range on either side of a position determined by the steering and speed controls.

4. A transmission arrangement as claimed in claim 2, wherein the steering control determines for each ratio control part a target displacement from the mean position, but the actual displacement of the ratio control part is able to vary through a limited range on either side of the target displacement under the influence of the torque reacted by the control part.

5. A transmission arrangement as claimed in claim 2, wherein the steering control acts upon each ratio control part through a compliant coupling arrangement, whereby the ratio control parts are each biased toward displacements from the mean position determined by the steering control, but are able to depart from these under the influence of the torques which they react.

6. A transmission arrangement as claimed in claim 2, wherein the steering control is operatively coupled to at least one steered vehicle wheel.

7. A transmission arrangement as claimed in claim 6, wherein the driven vehicle wheel speeds are able to vary to accommodate a vehicle turn radius dictated by the steered vehicle wheel.

8. A transmission arrangement as claimed in claim 1, wherein the ratio control parts are coupled to each other through a lever pivoted about a fulcrum, the lever serving to ensure that any displacement of one ratio control part from the mean position is accompanied by an equal and opposite displacement of the other.

9. A transmission arrangement as claimed in claim 8, wherein the position of the lever's fulcrum is movable by means of the speed control to determine the mean position.

10. A transmission arrangement as claimed in claim 8, wherein the steering control acts upon the lever to influence its rotational position.

11. A transmission arrangement as claimed in claim 10, wherein the steering control is coupled to the lever through a compliant mechanism.

12. A transmission arrangement as claimed in claim 1, wherein both variators are toroidal-race rolling-traction variators.

13. A transmission as claimed in claim 1, wherein both variators comprise a pair of races mounted for rotation about a common axis and having facing shaped surfaces which together define a substantially toroidal cavity, and at least one roller running upon the said shaped surfaces of the races to transmit drive from one to the other.

14. A transmission as claimed in claim 13, wherein the roller is provided with mountings which permit the roller to move circumferentially about the common axis.

15. A transmission as claimed in claim 14, wherein the variator's ratio control part acts upon the roller to determine the roller's circumferential position.

16. A transmission as claimed in claim 15, wherein the variator's ratio control part is a ratio control lever coupled to the roller and mounted for rotation about a fulcrum.

17. An arrangement for driving and steering a motor vehicle, the arrangement comprising: a user operable steering control; at least one steered vehicle wheel movable by means of the steering control to steer the vehicle; a right hand transmission for transmitting rotary drive between a motor vehicle engine and a right hand driven vehicle wheel at a continuously variable drive ratio; and a left hand transmission for transmitting rotary drive between the motor vehicle engine and a left hand driven vehicle wheel at a continuously variable drive ratio, wherein each transmission incorporates a variator defining a respective ratio-varying device in which a reaction torque from the variator is transmitted to a respective ratio control part whose position governs the variator's drive ratio, the ratio control part of each variator is operatively coupled to the steering control, whereby a difference in speeds of the right and left hand driven vehicle wheels is urged to vary in sympathy with the position of the steered vehicle wheel(s), and the operative coupling of each ratio control part to the steering control is compliant such that the ratio control part is permitted to move, under the influence of the reaction torque transmitted to the ratio control part, as necessary to reduce any mismatch between the aforementioned difference in wheel speeds and the radius of vehicle turn dictated by the steered vehicle wheel(s).

18. An arrangement as claimed in claim 17 wherein the ratio control parts of the respective variators are additionally operatively coupled to each other such that a compliant change in the position of one ratio control part is accompanied by an opposite change in the position of the other.

19. An arrangement as claimed in claim 18 wherein the coupling is such that the said changes of ratio control part position are equal and opposite.

20. An arrangement as claimed in claim 19, wherein the coupling comprises a lever connected between the ratio control parts of the left and right hand variators and arranged to cause one to advance as the other retreats.

21. An arrangement as claimed in claim 17, further comprising a user operable speed control operatively coupled to the ratio control parts of both variators.

22. An arrangement as claimed in claim 21, wherein the speed control dictates a mean position of the two ratio control parts.

23. An arrangement as claimed in claim 21, wherein the speed control dictates an average of the two continuously variable drive ratios.

24. An arrangement for driving a motor vehicle, the arrangement comprising: a user-operable speed control; a first variator defining a continuously variable ratio device coupled between the engine and a right hand vehicle wheel and serving to control a first ratio, at which the right hand vehicle wheel is driven by the engine; a second variator defining a continuously variable ratio device coupled between the engine and a left hand vehicle wheel and serving to control a second ratio, at which the left hand vehicle wheel is driven from the engine, wherein each variator being configured such that a reaction torque from each variator is reacted through a respective movable ratio control part whose position governs the respective first or second ratio, and a control arrangement is coupled to the control parts and serves to set target values of the first and second ratios in dependence upon driver input, the variator ratios being able to deviate from their target values under the influence of the reaction torques by the control parts, and the control parts being coupled together such that an increase in one of the ratios is accompanied by a decrease in the other, such that a difference in speeds of the left and right hand wheels is able to vary whilst control over vehicle speed is maintained.

* * * * *